United States Patent
Liu et al.

(10) Patent No.: US 11,576,376 B2
(45) Date of Patent: Feb. 14, 2023

(54) AQUEOUS COMPOSITIONS COMPRISING DICAMBA AND A BUILT-IN DRIFT CONTROL AGENT

(71) Applicant: RHODIA OPERATIONS, Paris (FR)

(72) Inventors: Hong Liu, Pennington, NJ (US); Charles Manzi-Nshuti, Burlington, MA (US)

(73) Assignee: RHODIA OPERATIONS, Paris (FR)

( * ) Notice: Subject to any disclaimer, the term of this patent is extended or adjusted under 35 U.S.C. 154(b) by 489 days.

(21) Appl. No.: 16/185,298

(22) Filed: Nov. 9, 2018

(65) Prior Publication Data

US 2019/0133117 A1    May 9, 2019

Related U.S. Application Data

(60) Provisional application No. 62/583,745, filed on Nov. 9, 2017.

(51) Int. Cl.
| | |
|---|---|
| *A01N 25/22* | (2006.01) |
| *A01N 25/24* | (2006.01) |
| *A01N 25/02* | (2006.01) |
| *A01N 37/10* | (2006.01) |
| *A01N 25/30* | (2006.01) |
| *A01N 25/06* | (2006.01) |

(52) U.S. Cl.
CPC ............ *A01N 25/22* (2013.01); *A01N 25/02* (2013.01); *A01N 25/06* (2013.01); *A01N 25/24* (2013.01); *A01N 25/30* (2013.01); *A01N 37/10* (2013.01)

(58) Field of Classification Search
None
See application file for complete search history.

(56) References Cited

U.S. PATENT DOCUMENTS

| | | | |
|---|---|---|---|
| 4,412,018 A | 10/1983 | Finlayson et al. | |
| 4,434,075 A | 2/1984 | Mardis et al. | |
| 4,577,112 A | 3/1986 | Conche et al. | |
| 2009/0064216 A1 | 3/2009 | Ishizuka et al. | |
| 2010/0292079 A1* | 11/2010 | Fowler | A01N 37/22 504/101 |
| 2012/0122688 A1 | 5/2012 | Wu et al. | |
| 2012/0142532 A1* | 6/2012 | Wright | A01N 25/22 504/144 |
| 2014/0134270 A1* | 5/2014 | Wu | A01N 25/24 424/632 |
| 2017/0035046 A1 | 2/2017 | Goyal et al. | |
| 2017/0172143 A1 | 6/2017 | McKnight et al. | |
| 2017/0238536 A1 | 8/2017 | Goyal et al. | |

FOREIGN PATENT DOCUMENTS

| | | |
|---|---|---|
| WO | 2013189773 A1 | 12/2013 |
| WO | 2014040119 A1 | 3/2014 |
| WO | 2016124467 A1 | 8/2016 |

OTHER PUBLICATIONS

Technical Data Sheet [online] for ATTAGEL-40, obtained from the internet on (Jul. 16, 2021), from URL <https://azelisamericascase.com/wp-content/uploads/2018/07/Attagel-40.pdf>.*
McCutcheon's, vol. 1: Emulsifiers & Detergents, McCutcheon's Directories, Glen Rock, USA, 2008 (International Ed. on North American Ed.).

* cited by examiner

*Primary Examiner* — Nannette Holloman
(74) *Attorney, Agent, or Firm* — Osha Bergman Watanabe & Burton LLP

(57) ABSTRACT

Disclosed are pesticide composition comprising, by total weight of the composition (i) a pesticide comprising at least one water-soluble salt of an auxin herbicide; (ii) greater than about 1 wt % of an incompletely hydrated drift control agent suspended in a liquid medium; (iii) optionally, a hydration inhibitor component comprising choline chloride, a glycol, a glycol derivative, glycerine, a glycerine derivative or a combination thereof; and (iv) a suspending agent in an amount effective to impart shear thinning properties to the composition. In one embodiment, the suspending agent comprises (i) xanthan gum; and (ii) attapulgite.

34 Claims, No Drawings

AQUEOUS COMPOSITIONS COMPRISING DICAMBA AND A BUILT-IN DRIFT CONTROL AGENT

CROSS-REFERENCE TO RELATED APPLICATIONS

This application claims the benefit of U.S. Provisional Application Ser. No. 62/583,745, filed Nov. 9, 2017, incorporated herein by reference in its entirety.

FIELD OF THE INVENTION

The present invention relates to an aqueous composition comprising at least an auxin herbicide and a drift control agent. It relates more particularly to a concentrated blend of at least one water-soluble salt of an auxin herbicide and of a drift control agent.

BACKGROUND OF THE INVENTION

Auxin herbicides are a well-known class of herbicides used to kill weeds by inducing hormonal effects on sprayed plants. They are thus commonly used to control auxin-susceptible plant growth. Typical representatives of auxin herbicides include 2,4-D (2,4-dichlorophenoxyacetic acid) and dicamba (3,6-dichloro-2-methoxybenzoic acid).

Spray drift is a problem frequently faced when using this class of herbicides.

Spray drift is defined by the Environmental Protection Agency as the movement of pesticide dust or droplets through the air at the time of application or soon thereafter, to any site other than the area intended.

Non-target plant damage associated with auxin herbicide spray drift is a major concern for crop growers. The unintentional application of auxin herbicides to sensitive plants generally cause severe injury, loss of yield, and even death of the non-target plants.

This is the reason why there is an increasing demand today for auxin herbicide compositions with improved spray drift control properties.

SUMMARY OF THE INVENTION

Various drift control agents are already known in the art. Drift control agents can be defined as chemical agents that enhance drift control of spray applied pesticide composition and/or provides "anti-rebound" properties to the spray applied pesticide composition, that is, reduces rebound of the spray applied pesticide from a target substrate, such as e.g., the foliage of a target plant.

Typical examples of drift control agents include for instance polysaccharide polymers, polyacrylamide polymers and emulsified fatty compounds.

As a rule, the drift control agent may be added to the spray tank (so-called tank-mix adjuvants) or may be incorporated directly into the concentrated herbicide composition (so-called built-in adjuvants).

Tank mixes are combinations of agricultural products (pesticide formulation and tank mix adjuvant compositions) that a farmer would pour into a tank (in which the tank mix is prepared), with water and perhaps other additives, mix (optionally by stirring) and then apply on the field shortly thereafter, as these mixes are typically not stable for extended periods of time. However, tank mixes face a variety of issues such as use of incorrect ingredients, human error in measuring the relative component amounts, and improper mixing steps. This can result in reduced effectiveness of the spray formulation, precipitation or gelation in the tank, clogged spray nozzles or clogged screens, excessive residue or runoff, or plant phyto-toxicity.

The use of known drift control agents for preparing a tank mix composition of an auxin herbicide has already been reported in the past.

Given the drawbacks associated with tank mixes, there remains a need today for stable concentrated compositions of one water-soluble salt of an auxin herbicide that contain a sufficient amount of a drift control agent in a one-pack concept (built-in), that is to say for composition of one water-soluble salt of an auxin herbicide that comprises a relatively high concentration of an auxin herbicide, in particular a high concentration of a water-soluble salt of an auxin herbicide, and of a drift control agent, and that is intended to be heavily diluted at the point of use to provide an auxin herbicide composition for application to target pests exhibiting an improved drift control.

In particular, there remains a need today for stable concentrated compositions of at least one water-soluble salt of an auxin herbicide that contain a relatively high amount of a water-soluble salt (whether it be a water-soluble salt of said auxin herbicide and/or a water-soluble salt of an additional herbicide and/or added water-soluble salt) and a sufficient amount of a drift control agent and that does not require the use of a separate tank-mix adjuvant by the end user to realize the full biological potential of the dose of herbicide applied per unit crop area and/or to achieve acceptable drift control.

There remains more particularly a need today for stable concentrated compositions of at least one water-soluble salt of an auxin herbicide that exhibit at the same time acceptable storage stability, dilution miscibility and stability and acceptable spray drift control properties when said concentrated composition is diluted in water in a spray tank for soil or foliar application.

One of the major challenges to resolve the above-mentioned technical problems is to incorporate significant amounts of known drift control agents, such as for instance polysaccharide polymers, polyacrylamide polymers and emulsified fatty compounds, into concentrated compositions of at least one water-soluble salt of an auxin herbicide containing a relatively high amount of a water-soluble salt (whether it be a water-soluble salt of said auxin herbicide and/or a water-soluble salt of an additional herbicide and/or added water-soluble salt), while improving at least one of the target attributes of said concentrated composition, in particular storage stability, dilution miscibility and stability and acceptable spray drift control properties when said concentrated composition is diluted in water in a spray tank for soil or foliar application.

Incorporating significant amounts of drift control agents is critical in concentrated compositions since, as mentioned previously, said concentrated compositions are then intended to be heavily diluted at the point of use and the diluted composition shall include a minimum amount of said drift control agent to achieve acceptable drift control.

It is widely known that typical polymeric drift control agents, in particular water-soluble polymers such as polysaccharide polymers (e.g. guars) or polyacrylamide polymers, need to be added into such formulations in a suspended form (for instance in a incompletely hydrated form) to avoid a significant and detrimental increase in viscosity. As a matter of fact, even a low amount of water-soluble polymer, when in a hydrated state, can yield to a formulation that is no longer pourable, for example, as a gel.

When the drift control agent is in the form of an emulsified fatty compound, it is common to use a suspending agent to favor long term stability of the emulsion in order to avoid phase separation which would be also detrimental to the formulation stability and/or to the drift control properties.

The main difficulty lies in the fact that the performances of traditional suspending agents, such as for instance xanthan gum, or silica used in the prior art, are reduced in the presence of a relatively high amount of a water-soluble salt, which may especially impact some target attributes, such as for instance storage stability over time. As a matter of fact, the presence of a relatively high amount of a water-soluble salt (and thus a high electrolytic level) in the concentrated composition can potentially prevent the full hydration of such traditional suspending agents, thereby negatively impacting their performances.

This may result, for instance, in deteriorated suspending properties or in a negative impact on long term stability or in the presence of residual gel particles, or even in the hydration of water-soluble drift control polymers, leading to progressive viscosity increase of the composition or to rapid phase separation.

There remains thus a need for a suspending agent exhibiting improved properties, especially in the presence of a relatively high amount of a water-soluble salt, and making it possible to prepare stable concentrated compositions of at least one water-soluble salt of an auxin herbicide and of at least one drift control agent, in particular in the case where said drift control agent is in the form of particles (for instance particles of an incompletely hydrated water-soluble polymer) or in the form of droplets (for instance droplets of a fatty drift control agent formulated as an emulsion).

It is in particular desirable to provide a stable concentrated composition of at least one water-soluble salt of an auxin herbicide and of at least one drift control agent as described previously that exhibit improved properties especially in terms of storage stability, dilution miscibility and stability and/or acceptable spray drift control properties when said concentrated composition is diluted in water in a spray tank for soil or foliar application.

It has now been discovered, unexpectedly, that the use of a specific suspending agent or a combination of specific suspending agents made it possible to achieve this goal.

In particular, it has been discovered that the specific suspending agent of the invention as described below was particularly effective to bring improved suspension properties under such conditions (namely in concentrated formulations containing a relatively high amount of a water-soluble salt and a drift control agent as described previously).

The present invention relates to, in one aspect, a pesticide composition comprising, by total weight of the composition: (a) a pesticide comprising an auxin herbicide or a salt thereof; (b) greater than about 1 wt % of an incompletely hydrated water-soluble polymer suspended in a liquid medium; (c) optionally, a hydration inhibitor component comprising choline chloride, a glycol, a glycol derivative, glycerine, a glycerine derivative or a combination thereof; and (d) a suspending agent in an amount effective to impart shear thinning properties to the composition Advantageously, the suspending agent is present in an amount effective to impart shear thinning properties to the composition.

The drift control agent of the invention (which is either in the form of particles (for instance particles of an incompletely hydrated water-soluble polymer) or in the form of droplets (for instance droplets of a fatty drift control agent formulated as an emulsion)) will thus remain suspended if the yield strength in the medium is sufficient to overcome the effect of settling or buoyancy on those particles/droplets.

DETAILED DESCRIPTION

The term "auxin herbicide" refers to a herbicide that functions as a mimic of an auxin plant growth hormone, thereby affecting plant growth regulation. Examples of auxin herbicides that are suitable for use in the herbicidal compositions of the present invention include, without limitation, benzoic acid herbicides, phenoxy herbicides, pyridine carboxylic acid herbicides, pyridine oxy herbicides, pyrimidine carboxy herbicides, quinoline carboxylic acid herbicides, and benzothiazole herbicides.

According to anyone of the invention embodiments, the auxin herbicide is selected in the group consisting of 2,4-D (2,4-dichlorophenoxyacetic acid), 2,4-DB (4-(2,4-dichlorophenoxy)butanoic acid), dichloroprop (2-(2,4-dichlorophenoxy)propanoic acid), MCPA ((4-chloro-2-methylphenoxy) acetic acid), MCPB (4-(4-chloro-2-methylphenoxy) butanoic acid), aminopyralid (4-amino-3,6-dichloro-2-pyridinecarboxylic acid), clopyralid (3,6-dichloro-2-pyridinecarboxylic acid), fluoroxypyr ([[(4-amino-3,5-dichloro-6-fluoro-2-pyridinyl)oxy]acetic acid), triclopyr ([(3,5,6-trichloro-2-pyridinyl)oxy]acetic acid), diclopyr, mecoprop (2-(4-chloro-2-methylphenoxy)propanoic acid) and mecoprop-P, dicamba (3,6-dichloro-2-methoxybenzoic acid), picloram (4-amino-3,5,6-trichloro-2-pyridinecarboxylic acid), quinclorac (3,7-dichloro-8-quinolinecarboxylic acid), aminocyclopyrachlor (6-amino-5-chloro-2-cyclopropyl-4-pyrimidinecarboxylic acid), agriculturally acceptable salts of any of these herbicides, racemic mixtures and resolved isomers thereof, and mixtures thereof.

According to anyone of the invention embodiments, the auxin herbicide is dicamba, or an agriculturally acceptable salt or ester thereof, for instance dicamba sodium salt, dicamba potassium salt, dicamba monoethanolamine salt, dicamba diethanolamine salt, dicamba isopropylamine salt, dicamba diglycolamine salt, dicamba N,N-bis-(3-aminopropyl)methylamine salt or dicamba dimethylamine salt. In one embodiment, the dicamba salt is (i) a secondary, tertiary or quaternary alkylamine or (ii) a primary, secondary, tertiary or quaternary alkanolamine, alkylalkanolamine or alkoxyalkanolamine salt, wherein the alkyl and alkanol groups are saturated and contain from $C_1$-$C_4$ carbon atoms.

According to anyone of the invention embodiments, the pesticide comprises a dicamba salt, wherein the salt is N,N-bis(3-aminopropyl)methylamine, diethanolamine, monoethanolamine, dimethylamine, isopropylamine, dimethylethanolamine, diglycolamine, potassium, choline, or sodium.

According to anyone of the invention embodiments, the pesticide comprises dicamba diglycolamine (DGA) salt or dicamba N,N-bis(3-aminopropyl)methylamine (BAPMA) salt.

Other dicamba salts that can be used according to the present invention, especially dicamba polyamine salts, are recited for instance in WO2013/189773 which is herein incorporated by reference in its entirety.

According to another one of the invention embodiments, the herbicidal composition comprises at least 2,4-D, or an agriculturally acceptable salt or ester thereof.

For instance, a herbicidal composition of the invention may comprise a 2,4-D salt selected in the group consisting of: the choline, dimethylamine, and isopropylamine salts, and combinations thereof.

For instance, a herbicidal composition of the invention may comprise a 2,4-D ester selected in the group consisting of: the methyl, ethyl, propyl, butyl (2,4-DB), and isooctyl esters, and combinations thereof.

According to anyone of the invention embodiments, the concentrated composition of the invention contains at least one water-soluble salt of an auxin herbicide as described previously, in particular at least one agriculturally acceptable water-soluble salt of dicamba, for instance dicamba sodium salt, dicamba potassium salt, dicamba monoethanolamine salt, dicamba diethanolamine salt, dicamba isopropylamine salt, dicamba diglycolamine salt, dicamba N,N-bis-(3-aminopropyl)methylamine salt or dicamba dimethylamine salt, and combinations thereof.

According to anyone of the invention embodiments, the concentrated composition of the invention contains at least one water-soluble salt of an auxin herbicide as described previously, in particular at least one agriculturally acceptable water-soluble salt of 2,4-D, for instance 2,4-D choline salt, 2,4-D dimethylamine salt, or 2,4-D isopropylamine salt, and combinations thereof A concentrated composition of the invention usually contains at least 300 g/l, more preferably at least 400 g/l, and in particular at least 450 g/l acid equivalents (a.e.) of auxin herbicide, in particular dicamba.

According to anyone of the invention embodiments, the concentrated composition of the invention may comprise at least 300 g/L acid equivalents (a.e.) of at least one water-soluble salt of an auxin herbicide, in particular dicamba.

A concentrated composition of the invention contains usually up to 800 g/l, preferably up to 700 g/l, more preferably up to 650 g/l, and in particular up to 600 g/l acid equivalents (a.e.) of auxin herbicide, in particular dicamba.

A composition of the invention comprises an aqueous liquid medium.

As used herein, the terminology "aqueous medium" means a single phase liquid medium that contains more than a trace amount of water, typically, based on 100 pbw of the aqueous medium, more than 0.1 pbw water. Suitable aqueous media more typically comprise, based on 100 pbw of the aqueous medium, greater than about 5 pbw water, even more typically greater than 10 pbw water. In one embodiment, the aqueous medium comprises, based on 100 pbw of the aqueous medium, greater than 40 pbw water, more typically, greater than 50 pbw water. The aqueous medium may, optionally, further comprise water soluble or water miscible components dissolved in the aqueous medium. The terminology "water miscible" as used herein means miscible in all proportions with water. Suitable water miscible organic liquids include, for example, (C1-C3)alcohols, such as methanol, ethanol, and propanol, and (C1-C3)polyols, such as glycerol, ethylene glycol, and propylene glycol.

According to anyone of the invention embodiments, a composition of the invention comprises greater than about 10 wt % of an aqueous liquid medium, for instance from about 10 wt % to about 80 wt %, for instance from about 15 wt % to about 75 wt % of an aqueous liquid medium relative to the total weight of the composition.

Rheological Agent (RA)

The suspending agent used in a composition of the present invention comprises at least one hydrophobic silica.

Hydrophobic silica used in the present invention comprises hydrophobic fumed silica and hydrophobic precipitation-process silica (also known as "precipitated" silica), among which the hydrophobic fumed silica is preferred.

After having been substituted by alkyl groups, the silica products are classified according to the different substitution groups into silylated silica, dimethyl-silylated silica, trimethyl-silylated silica and polydimethylsiloxane-silylated silica.

The hydrophobic silica can have been hydrophobized by means of a surface-modifying agent or by means of a silane.

A compound from the following list can be used as surface-modifying agent or as silane:

a) organosilanes of the type $(RO)_3Si(C_nH_{2n+1})$ and $(RO)_3Si(C_nH_{2n-1})$
R=alkyl, e.g. methyl, ethyl, n-propyl, iso-propyl, butyl
n=from 1 to 20 b) organosilanes of the type $R'_x(RO)_ySi(C_nH_{2n+1})$ and $R'_x(RO)_ySi(C_nH_{2n-1})$
R=alkyl, e.g. methyl, ethyl, n-propyl, iso-propyl, butyl
R'=alkyl, e.g. methyl, ethyl, n-propyl, iso-propyl, butyl or cycloalkyl
n=from 1 to 20
x+y=3
x=1 or 2
y=1 or 2 c) haloorganosilanes of the type $X_3Si(C_nH_{2n+1})$ and $X_3Si(C_nH_{2n-1})$
X=Cl, Br
n=from 1 to 20 d) haloorganosilanes of the type $X_2(R')Si(C_nH_{2n+1})$ and $X_2(R')Si(C_nH_{2n+1})$
X=Cl, Br
R'=alkyl, e.g. methyl, ethyl, n-propyl, iso-propyl, butyl or cycloalkyl
n=from 1 to 20 e) haloorganosilanes of the type $X(R')_2Si(C_nH_{2n+1})$ and $X(R')_2Si(C_nH_{2n-1})$
X=Cl, Br
R'=alkyl, e.g. methyl, ethyl, n-propyl, iso-propyl, butyl or cycloalkyl
n=from 1 to 20 f) organosilanes of the type $(RO)_3Si(CH_2)_m$—R'
R=alkyl, e.g. methyl, ethyl, propyl
m=0, or from 1 to 20
R'=methyl, aryl (e.g. —$C_6H_5$, substituted phenyl radicals)
—$C_4F_9$, $OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$, where R can be methyl, ethyl, propyl, butyl
—$S_x$—($CH_2$)$_3$Si(OR)$_3$, where R can be methyl, ethyl, propyl, butyl,
—SH
—NR'R"R"' (R'=alkyl, aryl; R"=H, alkyl, aryl; R"'=H, alkyl, aryl, benzyl, $C_2H_4NR$""R"", where
R""=H, alkyl and R""'=H, alkyl)

g) organosilanes of the type $(R")_x(RO)_ySi(CH_2)_m$—R'
R"=alkyl or cycloalkyl
x+y=2
x=1 or 2 y=1 or 2
m=0 or from 1 to 20
R'=methyl, aryl (e.g. —$C_6H_5$, substituted phenyl radicals)
—$C_4F_9$, $OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$, where R can be methyl, ethyl, propyl, butyl
—$S_x$—($CH_2$)$_3$Si(OR)$_3$, where R can be methyl, ethyl, propyl, butyl,
—SH
—NR'R''R'''(R'=alkyl, aryl; R''=H, alkyl, aryl; R'''=H, alkyl, aryl, benzyl, $C_2H_4$NR''''R''''', where
R''''=H, alkyl and R'''''=H, alkyl)
h) haloorganosilanes of the type $X_3Si(CH_2)_m$—R'
X=Cl, Br
m=0 or from 1 to 20
R'=methyl, aryl (e.g. —$C_6H_5$, substituted phenyl radicals)
—$C_4F_9$, $OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$, where R can be methyl, ethyl, propyl, butyl
—$S_x$($CH_2$)$_3$Si(OR)$_3$, where R can be methyl, ethyl, propyl, butyl,
—SH
i) haloorganosilanes of the type (R)$X_2Si(CH_2)_m$—R'
X=Cl, Br
R=alkyl, e.g. methyl, ethyl, propyl
m=0 or from 1 to 20
R'=methyl, aryl (e.g. —$C_6H_5$, substituted phenyl radicals)
—$C_4F_9$, $OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$, where R can be methyl, ethyl, propyl, butyl
—$S_x$—($CH_2$)$_3$Si(OR)$_3$, where R can be methyl, ethyl, propyl, butyl,
—SH
j) haloorganosilanes of the type (R)$_2XSi(CH_2)_m$—R'
X=Cl, Br
R=alkyl
m=0 or from 1 to 20
R'=methyl, aryl (e.g. —$C_6H_5$, substituted phenyl radicals)
—$C_4F_9$, $OCF_2$—CHF—$CF_3$, —$C_6F_{13}$, —O—$CF_2$—$CHF_2$
—$NH_2$, —$N_3$, —SCN, —CH=$CH_2$, —NH—$CH_2$—$CH_2$—$NH_2$,
—N—($CH_2$—$CH_2$—$NH_2$)$_2$
—OOC($CH_3$)C=$CH_2$
—$OCH_2$—CH(O)$CH_2$
—NH—CO—N—CO—($CH_2$)$_5$
—NH—COO—$CH_3$, —NH—COO—$CH_2$—$CH_3$,
—NH—($CH_2$)$_3$Si(OR)$_3$, where R can be methyl, ethyl, propyl, butyl
—$S_x$—($CH_2$)$_3$Si(OR)$_3$, where R can be methyl, ethyl, propyl, butyl,
—SH k) silazanes of the type

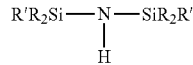

R=alkyl, vinyl, aryl
R'=alkyl, vinyl, aryl l) cyclic polysiloxanes of the type D 3, D 4, D 5, where D 3, D 4 and D 5 are cyclic polysiloxanes having 3, 4 or 5 units of the type —O—Si($CH_3$)$_2$—.
For example, octamethylcyclotetrasiloxane=D 4

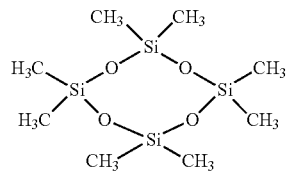

m) polysiloxanes or silicone oils of the type

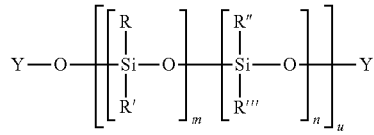

m=0, 1, 2, 3, . . . ∞
n=0, 1, 2, 3, . . . ∞
u=0, 1, 2, 3, . . . ∞
Y=$CH_3$, H, $C_nH_{2n+1}$ n=1-20
Y=Si($CH_3$)$_3$, Si($CH_3$)$_2$H
Si($CH_3$)$_2$OH, Si($CH_3$)$_2$(O$CH_3$)
Si($CH_3$)$_2$($C_2H_{2n+1}$) n=1-20
R=alkyl, e.g. ($C_nH_{2n-1}$, where n=from 1 to 20, aryl, e.g. phenyl and substituted phenyl radicals, ($CH_2$)$_o$—$NH_2$, H
R'=alkyl, e.g. ($C_nH_{2n+1}$, where n=from 1 to 20, aryl, e.g. phenyl and substituted phenyl radicals, ($CH_2$)$_o$—$NH_2$, H
R''=alkyl, e.g. ($C_nH_{2n+1}$, where n=from 1 to 20, aryl, e.g. phenyl and substituted phenyl radicals, ($CH_2$)$_o$—$NH_2$, H
R'''=alkyl, e.g. ($C_nH_{2n+1}$, where n=from 1 to 20, aryl, e.g. phenyl and substituted phenyl radicals, ($CH_2$)$_o$—$NH_2$, H.

According to anyone of the invention embodiments, the hydrophobic silica of the invention is a hydrophobic fumed silica which has been hydrophobized by mean of an haloorganosilane of the type $X_2$(R')Si($C_nH_{2n+1}$) and $X_2$(R')Si($C_nH_{2n+1}$), wherein X=Cl or Br; R'=alkyl (e.g. methyl, ethyl, n-propyl, iso-propyl, butyl or cycloalkyl, preferably methyl) and n=from 1 to 20, preferably from 1 to 3.

According to anyone of the invention embodiments, the hydrophobic silica of the invention has a BET surface area of 70-350 m$^2$/g, and preferably 80-300 m$^2$/g.

Particularly suited for the present invention are hydrophobic fumed silicas having a BET surface area comprised between 100 and 250 m$^2$/g, for instance between 150 and 200 m$^2$/g.

According to anyone of the invention embodiments, the hydrophobic silica of the invention has a pH (measured in accordance to DIN EN ISO 787/9, ASTM D 1208, JIS K 5101/24 in water:methanol=1:1) comprised between 3.5 and 7.5, preferably between 3.5 and 6.5.

Particularly suited for the present invention are hydrophobic fumed silicas having a pH (measured in accordance to DIN EN ISO 787/9, ASTM D 1208, JIS K 5101/24 in water:methanol=1:1) comprised between 3.5 and 5.0.

As mentioned previously, hydrophobic (i.e. water-repellent) silicas are typically created by subjecting hydrophilic (i.e. able to be wetted by water) silicas to chemical post-treatment by means of a surface-modifying agent or by means of a silane.

In the end product, parts of the post-treatment agent have formed a firm chemical bond with the previously hydrophilic oxide.

Hydrophobizing substantially reduces the amount of moisture that is absorbed by hydrophilic silicas. This is the reason why hydrophobic silicas generally display a lower moisture uptake, compared to hydrophilic silicas.

For example, Aerosil R974, even at a relative air humidity of 80%, adsorbs just 0.5% water, whereas the hydrophilic Aerosil 200 with a comparable surface area absorbs some 10 times more.

According to anyone of the invention embodiments, the hydrophobic silica of the invention has a loss on drying (2 h at 105° C., when leaving the plant, measured in accordance to DIN EN ISO 787/2, ASTM D 280, JIS K 5101/21) lower than or equal to 2.0, especially lower than or equal to 1.0 and preferably lower than or equal to 0.5.

In one embodiment, the hydrophobic silica may be a hydrophobic precipitated silica.

The hydrophobic precipitated silica suitable for the present invention includes SIPERNAT® D17 precipitation silica (supplied by Evonik Degussa GmbH).

In another embodiment, the hydrophobic silica may be a hydrophobic fumed silica.

The hydrophobic fumed silica includes the hydrophobic fumed silica supplied under the trade name of AEROSIL®, Cab-o-Sil® and MK®, and is preferably one or more selected from the group consisting of AEROSIL® R202, AEROSIL® R972, AEROSIL® R805, AEROSIL® R8200, AEROSIL® R974, AEROSIL® R812S and AEROSIL® R812 (all supplied by Evonik Degussa GmbH).

According to anyone of the invention embodiments, the hydrophobic silica of the invention is a hydrophobic fumed silica which has been hydrophobized by means of dimethyldichlorosilane.

Fumed silica hydrophobized by means of dimethyldichlorosilane is known for instance from DE 11 63 784. Typical examples of fumed silica hydrophobized by means of dimethyldichlorosilane include the fumed silica AEROSIL R974, which can preferably be used.

According to anyone of the invention embodiments, a concentrated composition of the invention comprises greater than about 0.5 wt % of hydrophobic silica, for instance greater than about 1 wt % of hydrophobic silica, relative to the total weight of the concentrated composition.

According to anyone of the invention embodiments, a concentrated composition of the invention comprises less than about 25 wt % of hydrophobic silica, for instance less than about 15 wt % of hydrophobic silica, for instance less than about 10 wt % of hydrophobic silica, relative to the total weight of the concentrated composition.

The present invention provides a pesticide composition characterized in that it comprises, as suspending agent, a hydrophobic silica, preferably a hydrophobic fumed silica, in particular a fumed silica which has been hydrophobized by dimethyldichlorosilane.

Another preferred subject matter of the invention is a process for the preparation of a concentrated composition of at least one water-soluble salt of an auxin herbicide exhibiting at the same time acceptable storage stability, dilution miscibility and stability and acceptable spray drift control properties when said concentrated composition is diluted in water in a spray tank, which is characterized in that a hydrophobic silica, preferably a hydrophobic fumed silica, in particular a fumed silica which has been hydrophobized by dimethyldichlorosilane, is added to the concentrated composition.

Another preferred subject matter of the invention is the use of a hydrophobic silica, preferably a hydrophobic fumed silica, in particular a fumed silica which has been hydrophobized by dimethyldichlorosilane, for the improvement of the storage stability and of the suspending properties of a concentrated composition of the invention.

The smectite clay used in the present invention is an organically modified smectite clay (organoclay), i.e. a smectite clay modified with an organic chemical composition.

More particularly, the smectite clay used in the present invention is the ion-exchanged reaction product of (a) a smectite clay and (b) one or more quaternary ammonium compounds and/or (c) one or more organic materials.

In other words, the organically modified smectite clay of the invention is an organic chemical/clay mixture prepared by the reaction of a smectite clay and one or more quaternary ammonium compounds, and/or optionally one or more organic materials.

Smectite clays are swellable layered clays which contain individual platelets.

Useful swellable layered materials include phyllosilicates such as smectite clay minerals, e.g., montmorillonite, particularly sodium montmorillonite; bentonite; hectorite; saponite; stevensite; beidellite; and the like.

Smectite clays used according to the invention may typically be bentonite and hectorite.

Smectite clays possess some structural characteristics similar to the better-known minerals talc and mica. Their crystal structures consist of two-dimensional layers formed by fusing two silica tetrahedral sheets to an edge-shared dioctahedral or trioctahedral sheet of either alumina (for example bentonite) or magnesia (for example hectorite) —each of the different smectite clays having somewhat different structures. Stacking of these layers in nature in depths of hundreds or more is caused by ionic and weak Van der Waals forces. The area between the platelets is occupied by cations which balance the charge deficiency that is generated by isomorphous substitution (often called disharmonies) within the platelet lattices.

As used herein the term "interlayer spacing" refers to the distance between the internal faces of adjacent smectite clay platelet layers, either in the dry state or as incorporated into a polymer. The interlayer spacing is measured by standard X-Ray Diffraction techniques.

The smectite clays which may be used in the present invention are preferably smectite-type clays having a cationic exchange capacity of at least 50 milliequivalents per 100 grams of clay, 100% active clay basis, as determined by the well-known ammonium acetate or methylene blue methods.

Smectite-type clays are well known in the art and are commercially available from a variety of sources. Prior to use in the invention, the clays may preferably be converted to the sodium form if they are not already in this form. This may be conveniently carried out by preparing an aqueous clay slurry and passing the slurry through a bed of cation exchange resin in the sodium form. Alternatively, the clay can be mixed with water and a soluble sodium compound, such as sodium carbonate, sodium hydroxide, etc., and the mixture sheared, such as with a pugmill or extruder.

Representative smectite clays useful in accordance with the present invention are the following:

Montmorillonite

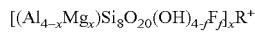

where $0.55<x<1.10$, $f<4$ and R is selected from the group consisting of Na, Li, NH$_4$, and mixtures thereof;

Bentonite

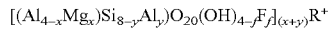

where $0<x<1.10$, $0<y<1.10$, $0.55<(x+y)<1.10$, $f<4$ and R is selected from the group consisting of Na, Li, NH$_4$, and mixtures thereof;

Hectorite

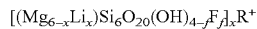

where $0.57<x<1.15$, $f<4$ and R is selected from the group consisting of Na, Li, NH$_4$, and mixtures thereof;

Saponite

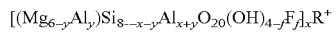

where $0.58<x<1.18$, $0<y<0.66$, $f<4$ and R is selected from the group consisting of Na, Li, NH$_4$, and mixtures thereof; and Stevensite

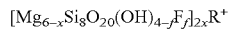

where $0.28<x<0.57$, $f=4$ and R is selected from the group consisting of Na, Li, NH$_4$, mixtures thereof.

Beidellite

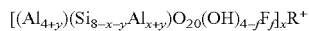

where $0.55<x<1.10$, $0<y<0.44$, $f<4$ and R is selected from the group consisting of Na, Li, NH$_4$, and mixtures thereof;

The preferred clays used in the present invention are bentonite and hectorite.

Both sheared and non-sheared forms of the above-listed smectite clays may be employed.

The smectite clay used in the present invention is a beneficiated smectite clay, that is to say a smectite clay that has been purified so that some or most of the impurities in the crude clay have been removed.

Crude smectite clay can be defined as smectite clay containing gangue or non-clay material.

Beneficiated smectite clay used in the present invention differs from crude smectite clay in that gangue has been removed. Beneficiated smectite clays used in the present invention are smectite clays that have undergone clay beneficiation process.

Compound(s) (b) of the invention is one or more quaternary ammonium compounds.

Particularly useful are quaternary ammonium compounds which include those having the formula:

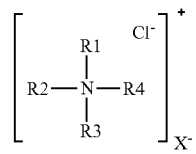

wherein R1 comprises a group selected from (i) linear or branched aliphatic, aralkyl, or aromatic hydrocarbon groups having from 8 to 30 carbon atoms or (ii) alkyl or alkyl-ester groups having 8 to 30 carbon atoms; R2, R3, and R4 are independently selected from the group consisting of (a) linear or branched aliphatic hydrocarbon, fluorocarbon, or other halocarbon groups having from 1 to about 30 carbon atoms; (b) aralkyl or aromatic groups having from 6 to about 30 carbon atoms, (c) alkoxylated groups containing from 1 to about 80 moles of alkylene oxide; (d) amide groups, (e) oxazolidine groups, (f) allyl, vinyl, or other alkenyl or alkynyl groups possessing reactive unsaturation and having from 2 to about 30 carbon atoms, and (g) hydrogen: and X' comprises an anion selected from the group consisting of chloride, methyl sulfate, acetate, iodide, and bromide, preferably chloride.

For purposes of this invention, quaternary phosphonium and sulfonium based salts are defined as within the definition of quaternary ammonium compound.

The raw materials used to make the quaternary amonium compounds can be derived from natural oils such as tallow, soya, coconut and palm oil. Useful aliphatic groups in the above formula may be derived from other naturally occurring oils including various vegetable oils, such as corn oil, coconut oil, soybean oil, cottonseed oil, castor oil and the like, as well as various animal oils or fats. The aliphatic groups may likewise be petrochemically derived from, for example, alpha olefins. Representative examples of useful branched, saturated radicals included 12-methylstearyl and 12-ethylstearyl.

Examples of useful aromatic groups include benzyl and benzylic-type materials derived from benzyl halides, benzhydryl halides, trityl halides, halophenylalkanes wherein the alkyl chain has from 1 to 30 carbon atoms, such as 1-halo-1-phenyloctadecane; substituted benzyl moieties, such as those derived from ortho-, meta-, and para-chlorobenzyl halides, para-methoxybenzyl halides, ortho-, meta-, and para-nitrilobenzyl halides, and ortho-, meta-, and para-alkylbenzyl halides wherein the alkyl chain contains from 1 to 30 carbon atoms; and fused ring benzyl-type moieties, such as those derived from 2-halomethylnaphthalene, 9-halomethylanthracene, and 9-halomethylphenanthrene, wherein the halo group comprises chloro, bromo, or any other such group which serves as a leaving group in the nucleophilic attack of the benzyl type moiety by a nitrogen atom to generate a substituted amine.

Examples of other aromatic groups include aromatic-type substituents such as phenyl and substituted phenyl; N-alkyl and N,N-dialkyl anilines, where the alkyl groups contain between 1 and 30 carbon atoms; ortho-, meta-, and para-nitrophenyl, ortho-, meta-, and para-alkyl phenyl, wherein the alkyl group contains between 1 and 30 carbon atoms; 2-, 3-, and 4-halophenyl wherein the halo group is defined as chloro, bromo, or iodo; and 2-, 3-, and 4-carboxyphenyl and esters thereof, where the alcohol of the ester is derived from an alkyl alcohol, wherein the alkyl group contains between 1 and 30 carbon atoms, aryl such as phenol, or aralkyl such as benzyl alcohols; and fused ring aryl moieties such as naphthalene, anthracene, and phenanthrene.

Preferred quaternary ammonium compounds for purposes of the invention comprises a quaternary ammonium salt that contains at least one, preferably two or three, hydrocarbon chains having from about 8 to about 30 carbon atoms and either no hydrophilic carbon chains or having hydrophilic radicals having a total of about 9 moles of ethylene oxide or less.

Some examples of preferred quaternary ammonium compounds to make the compositions of this invention are: dimethyl bis[hydrogenated tallow] ammonium chloride (2M2HT), methyl benzyl bis[hydrogenated tallow] ammonium chloride (MB2HT), and methyl tris[hydrogenated tallow alkyl] chloride (M3HT).

Materials suitable for optional element (c) of this invention include materials listed as anionic components in U.S. Pat. Nos. 4,412,018, 4,434,075, and 4,577,112. These include materials that are capable of reacting with component (b) of this invention and for intercalation with component (a) as an alkyl quarternary ammonium-organic anion complex. The molecular weight (gram molecular weight) of the organic anion is preferably 3,000 or less, and most preferably 1,000 or less and contains at least one anionic moiety per molecule as disclosed herein. The organic anion is preferably derived from an organic acid having a pKA less than about 11.0. As indicated, the source acid must contain at least one ionizable hydrogen having the preferred pKA in order to allow the formation of the alkyl quarternary ammonium-organic anion complex.

Exemplary types of suitable acidic functional organic compounds useful in this invention include:

(1) Carboxylic acids including:
  a) benzene carboxylic acids such as benzoic acid; ortho-, iso- and terephthalic acid; 1,2,3-benzenetricarboxylic acid; 1,2,4-benzenetricarboxylic acid; 1,3,5-benzenetricarboxylic acid; 1,2,4,5-benzenetetracarboxylic acid; 1,2,3,4,5,6-benzenehexacarboxylic acid (mellitic acid);
  b) alkyl carboxylic acids having the formula CH3(CH2)n-COOH, wherein n is a number from 0 to 20; such compounds include acetic acid; pentanoic acid; hexanoic acid; heptanoic acid; octanoic acid; nonanoic acid; decanoic acid; undecanoic acid; lauric acid; tridecanoic acid; tetradecanoic acid; pentadecanoic acid; hexadecanoicanoic acid; heptadecanoic acid; octadecanoic acid (stearic acid); nonadecanoic acid; eicosonic acid.
  c) Alkyl dicarboxylic acids having the formula HOOC—(CH2)n-COOH wherein n is 0 to 8 such as oxalic acid; malonic acid; succinic acid; glutaric acid; adipic acid; pimelic acid; suberic acid; azelaic acid; sebacic acid;
  d) Hydroxyalkyl carboxylic acids such as citric acid; tartaric acids; malic acid; mandelic acid; and 12-hydroxystearic acid;
  e) unsaturated alkyl carboxylic acids such as maleic acid; fumaric acid; and cinnamic acid;
  f) Fused ring aromatic carboxylic acids such as naphthalenic acid and anthracenecarboxylic acid;
  g) Cycloaliphatic acids such as cyclohexanecarboxylic acid; cyclopentanecarboxylic acid; furancarboxylic acids.

(2) Organic sulfuric acids including:
  a) sulfonic acids including:
  1) benzenesulfonic acids such as benzenesulfonic acid; phenolsulfonic acid; dodecylbenzenesulfonic acid; benzenedisulfonic acid; benzenetrisulfonic acids; para-toluenesulfonic acid; and 2) alkyl sulfonic acids such as methanesulfonic acid; ethanesulfonic acid; butanesulfonic acid; butanedisulfonic acid; sulfosuccinate alkyl esters such as dioctyl succinylsulfonic acid; and alkyl polyethoxy-succinyl sulfonic acid; and
  b) alkyl sulfates such as the lauryl half ester of sulfuric acid and the octadecyl half ester of sulfuric acid.

(3) Organophosphorus acids including phosphonic acids, phosphinic acids, thiophosphinic acids, phosphites, and phosphates as described in U.S. Pat. No. 4,412,018

(4) Phenols such as phenol; hydroquinone; t-butylcatechol; p-methoxyphenol; and naphthols.

(5) Thioacids as described in U.S. Pat. No. 4,412,018.

(6) Amino acids such as the naturally occurring amino acids and derivatives thereof such as 6-aminohexanoic acid; 12-aminododecanoic acid; N-phenylglycine; and 3-aminocrotonic acid.

Other materials useful for element c) can be selected from a wide variety of non-anionic materials as described in U.S. patent application Ser. No. 09/064,216, descriptions herein incorporated by reference. These materials are either water soluble, liquid, or can be made into a liquid at reaction temperature so that the aforementioned clay materials absorbs them. These materials can be any of a wide range of materials and can have a wide range of molecular weights.

Materials of this type suitable for element (c) of this invention include polyurethanes; polyamides; polyesters; polycarbonates; polyepoxides and polyolefins. Such materials also include polyethers (polymers and copolymers) based on ethylene oxide, butylene oxide, propylene oxide, phenols and bisphenols; polyesters (polymers and copolymers) based on aliphatic and aromatic diols and polyurethanes based on aliphatic and aromatic diisocyanates, polyamides (polymers and copolymers) based on aliphatic and aromatic diamines, and polycarbonates (polymers and copolymers) based on aliphatic or aromatic diols; polycarboimides (polymers and copolymers) based on tetrabasic acids and diamines, vinyl polymers and copolymers based on vinyl monomers, styrene and derivatives of styrene; acrylic polymers and copolymers based on acrylic monomers; copolymers based on styrene, vinyl and acrylic monomers; polyolefin polymers and copolymers based on ethylene, propylene and other alphaolefin monomers; polymers and copolymers based on dienes, isobutylenes and the like; and copolymers based on dienes, styrene, acryl and vinyl monomers. Other organic materials can include monomeric materials that have the functionality of the materials described above. The definition of element c) does not include quaternary ammonium compounds.

Specific preferred examples of useful non-anionic organic materials include THIXATROL VF-10 and THIXATROL VF-20 which are liquid polyester amide copolymers made by RHEOX. Examples of other specific materials are polyvinylpyrrolidone (PVP) or its hydrolysis product, polyvinyl alcohol (PVA), polymethacrylamide, poly(N,N-dimethylacrylamide), poly(N-isopropylacrylamide), poly(N-acetamidacrylamide), poly(N-acetimidomethacrylamide), polyvinyloxazolidone, and polyvinylmethyl oxazolidone, polyoxypropylene, polyoxyethylene and copolymers thereof.

The materials (b) and (c) can be reacted together, or in any order, with the smectite clay.

The amount of quaternary compound and optional organic compound used can vary over wide ranges. This amount is defined as the milleequivalent ratio which is the number of milliequivalents (m.e.) of the organic cation in the organoclay per 100 grams of clay, 100% active clay basis.

Normally, where only a quaternary is employed, at least 90 to 100 m.e. of organic cation, more typically 100 to 140 m.e. of quaternary salt based on 100 g of 100% active clay are preferred although lower and higher ratios are also useful.

It is typical that component (c), if present, is used at an amount of 5 to 100 milliequivalents, and more preferably 10 to 50 m.e., per 100 g of clay, 100% active basis.

The organoclays useful in the composites of this invention may be prepared in a number of ways. One is to first disperse the smectite clay in water. The clay is preferably dispersed in water at a concentration of from about 1 to 80%, most preferably from about 2 to 8% by weight. Optionally, the slurry may be centrifuged to remove non-clay impurities that constitute about 10% to 50% of the starting clay composition. If the optional organic material is to be part of the composition, it is added to the clay/water dispersion and mixed. This mixture can then be heated and is ion exchanged with a quaternary ammonium compound to form the final organoclay as a coagulate, which is washed with water and isolated by filtration. If only the optional organic material is used, it can be added to the purified clay/water slurry an adsorbed onto the clay. The clay is then isolated by drying.

A second general method to prepare this invention uses dry clay that is intimately mixed with the organic material in a heated device, such as an extruder. The mixture can also have some water present to facilitate intercalation. After the addition is complete, the quaternary ammonium compound and/or organic material is added and the final product is isolated. This composition can be washed with water and dried.

Both of the methods mentioned above where both components (b) and (c) are used can be modified by either: 1) reversing the order of addition, i.e., reacting the clay with the quaternary ammonium ion followed by the organic material; or 2) adding the quaternary ammonium compound and organic material to the clay simultaneously.

The reaction is preferably followed by drying and grinding the organoclay product.

The organoclay can further be incorporated into a polymer resin.

Suitable polymer resins include a very wide variety of resins. It can be any plastic material whether polar or non-polar. Such resins can include polyolefins which can consist of polyethylenes, polypropylenes, polybutylenes, polymethylpentane, polyisoprenes and copolymers thereof; copolymers of olefins and other monomers such as ethylene-vinyl acetate, ethylene acid copolymers, ethylene-vinyl alcohol, ethylene-ethyl acrylate, and ethylene-methyl acrylate. Ionomers are also useful and comprise metal salts of polyolefins copolymerized with acrylic acid. Other families of thermoplastic resins useful in this invention are acetals, acrylics, and cellulosics. Fluoropolymers and copolymers with other monomers are useful such as polytetrafluoroethylene (Teflon®), fluorinated ethylene-propylene, perfluoroalkoxy resins, polychlorotrifluoroethylene, ethylene-chlorofluoroethylene copolymer, polyvinylidene fluoride and polyvinylfluoride. Liquid crystal polymers, a family of polyester copolymers, can also be used.

Additional polymers are nitrile resins, polyamides (nylons), polyphenylene ether and polyamide-imide copolymers. Various polyesters are useful such as polyarylates, polybutylene terephthalate and polyethylene terephthalate. Engineering resins such as polycarbonate, polyetherimide, polyetheretherketone, polyphenylene sulfide and thermoplastic polyimides are good candidates. Polystyrene and copolymers such as ABS, SAN, ASA and styrene-butadiene are appropriate. Also included are the sulfone based resins such as polysulfone, polyethersulfone and polyarylsulfone. Elastomers comprising a wide variety of useful materials and include olefinic TPE's, polyurethane TPE's, and styrenic TPE's. Chlorinated polymers such as PVC, and polyvinylidene dichloride can also be used. In addition, miscible or immiscible blends and alloys of any of the above resin combinations are useful for this invention. Thermoset polymers such as epoxies, polyester resins and curing rubbers can also be used.

Incorporation of the organoclay of the invention into a polymer resin can be accomplished by mixing or blending the organoclay by any means that can create sufficient shear. The shear can be provided by any appropriate method such as mechanical, thermal shock, pressure changes, or ultrasonics as known in the art. Particularly useful are methods where a flowable polymer is mixed with the organoclay by mechanical means such as extruders, roll mills, stirrers, Banbury® type mixers, Brabender® type mixers, and continuous mixers. Other methods for making this invention can be postulated by those knowledgeable in the art.

According to anyone of the invention embodiments, the organically modified and beneficiated smectite clay of the invention has a bulk density lower than 1.5 g/cm$^3$, for instance lower than 1.0 g/cm$^3$, for instance lower than 0.8 g/cm$^3$, for instance lower than 0.7 g/cm$^3$.

According to anyone of the invention embodiments, the organically modified and beneficiated smectite clay of the invention is in the form of a finely divided soft powder, with a particle size of 80% lower than 125 µm (120 #).

Bentone® DY CE (supplied by Elementis, and having a bulk density of 0.65 g/cm$^3$) is a typical example of organically modified and beneficiated smectite clay suitable according to the present invention.

The attapulgite used in the present invention is a hydrated alumino-silicate with a tridimensional chain structure.

According to anyone of the invention embodiments, the suspending agent comprises at least one attapulgite of formula $(Mg,Al)_5Si_8O_{20}.4H_2O$.

According to anyone of the invention embodiments, the suspending agent comprises at least one inert powdered gelling grade of attapulgite, in particular of one attapulgite of formula $(Mg,Al)_5Si_8O_{20}.4H_2O$.

It may be finely pulverized to effectively form colloidal gels in ionic and non-ionic aqueous solutions to provide thixotropic thickening and suspension.

According to anyone of the invention embodiments, the attapulgite of the invention is in the form of a highly pulverized powder.

According to anyone of the invention embodiments, the attapulgite of the invention has a bulk density lower than 1,000 kg/m$^3$, for instance comprised between 100 and 900 kg/m$^3$, for instance lower than 700 kg/m$^3$, for instance comprised between 200 and 600 kg/m$^3$.

According to anyone of the invention embodiments, the attapulgite of the invention has a specific gravity greater than 1.3, for instance comprised between 1.5 and 3.5, for instance greater than 2.0, for instance comprised between 2.0 and 3.0.

Attagel® 50 (supplied by BASF, and having a bulk density of 400 kg/m$^3$ and a specific gravity of 2.4) is a typical example of attapulgite suitable according to the present invention.

In one embodiment, the suspending agent comprises a combination of a biopolymer and a second suspending agent component. In one embodiment, the biopolymer component of the suspending agent comprises xanthan gum. Xanthans of interest are xanthan gum and xanthan gel. Xanthan gum is a polysaccharide gum produced by Xathomonas campestris and contains D-glucose, D-mannose, D-glucuronic acid as the main hexose units, also contains pyruvate acid, and is partially acetylated.

In another embodiment, the suspending agent comprises xanthan gum, rheozan or diutan. In another embodiment, the suspending agent is a mixture of (i) xanthan gum, rheozan or diutan and (ii) inorganic colloidal or colloid-forming particles.

In one embodiment, the suspending agent is a mixture of (i) xanthan gum and (ii) inorganic colloidal or colloid-forming particles.

In one embodiment, the second suspending agent component of the composition of the present invention comprises an inorganic, typically aluminosilicate or magnesium silicate, colloid-forming clay, typically, a smectite (also known as montmorillonoid) clay, an attapulgite (also known as palygorskite) clay, or a mixture thereof. These clay materials can be described as expandable layered clays, wherein the term "expandable" as used herein in reference to such clay relates to the ability of the layered clay structure to be swollen, or expanded, on contact with water.

Smectites are three-layered clays. There are two distinct classes of smectite-type clays. In the first class of smectites, aluminum oxide is present in the silicate crystal lattice and the clays have a typical formula of $Al_2(Si_2O_5)_2(OH)_2$. In the second class of smectites, magnesium oxide is present in the silicate crystal lattice and the clays have a typical formula of $Mg_3(Si_2O_5)(OH)_2$. The range of the water of hydration in the above formulas can vary with the processing to which the clay has been subjected. This is immaterial to the use of the smectite clays in the present compositions in that the expandable characteristics of the hydrated clays are dictated by the silicate lattice structure. Furthermore, atomic substitution by iron and magnesium can occur within the crystal lattice of the smectites, while metal cations such as $Na^+$, $Ca^{+2}$, as well as $H^+$, can be present in the water of hydration to provide electrical neutrality. Although the presence of iron in such clay material is preferably avoided to minimize chemical interaction between clay and optional composition components, such cation substitutions in general are immaterial to the use of the clays herein since the desirable physical properties of the clay are not substantially altered thereby.

The layered expandable aluminosilicate smectite clays useful herein are further characterized by a dioctahedral crystal lattice, whereas the expandable magnesium silicate smectite clays have a trioctahedral crystal lattice.

Suitable smectite clays, include, for example, montmorillonite (bentonite), volchonskoite, nontronite, beidellite, hectorite, saponite, sauconite and vermiculite, are commercially available.

Attapulgites are magnesium-rich clays having principles of superposition of tetrahedral and octahedral unit cell elements different from the smectites. An idealized composition of the attapulgite unit cell is given as: $(H_2O)_4(OH)_2Mg_5Si_8O_{20}4H_2O$.

In one preferred embodiment, the suspension agent is a mixture of attapulgite and xanthan gum.

According to anyone of the invention embodiments, a concentrated composition of the invention comprises less than about 25 wt % of an organically modified smectite clay of the invention, for instance less than about 15 wt % of an organically modified smectite clay of the invention, for instance less than about 10 wt % of an organically modified smectite clay of the invention, relative to the total weight of the concentrated composition.

The present invention provides a pesticide composition characterized in that it comprises, as suspending agent, an organically modified smectite clay of the invention. Another preferred subject matter of the invention is a process for the preparation of a concentrated composition of at least one water-soluble salt of an auxin herbicide exhibiting at the same time acceptable storage stability, dilution miscibility and stability and acceptable spray drift control properties when said concentrated composition is diluted in water in a spray tank, which is characterized in that an organically modified smectite clay of the invention, is added to the concentrated composition.

Another preferred subject matter of the invention is the use of an organically modified smectite clay of the invention for the improvement of the storage stability and of the suspending properties of a concentrated composition of the invention.

In one embodiment, the suspension agent provides improved storage stability and suspending properties of a concentrated composition of the invention. In another embodiment, the suspension agent provides improved high temperature storage stability.

In one embodiment, the suspending agent of the present invention in utilized in an amount that is effective, either alone or in combination with one or more other suspending agents, to impart shear thinning viscosity to the composition, typically in an amount, based on 100 pbw of the composition, of at least 0.5 pbw, for instance of from greater than 1 pbw, more typically from about 2 pbw, and even more typically from about 1 pbw, to about 10 pbw, more typically to about 8 pbw, and even more typically to about 5 pbw.

According to anyone of the invention embodiments, a concentrated composition of the invention comprises greater than about 0.5 wt % of an organically modified smectite clay of the invention, for instance greater than about 1 wt % of an organically modified smectite clay of the invention, relative to the total weight of the concentrated composition. According to anyone of the invention embodiments, a concentrated composition of the invention comprises less than about 25 wt % of an organically modified smectite clay of the invention, for instance less than about 15 wt % of an organically modified smectite clay of the invention, for instance less than about 10 wt % of an organically modified smectite clay of the invention, relative to the total weight of the concentrated composition.

As used herein, the term "drift" refers to off-target movement of droplets of a pesticide composition that is applied to a target pest or environment for the pest. Spray applied compositions typically exhibit decreasing tendency to drift with decreasing relative amount, typically expressed as a volume percentage of total spray applied droplet volume, of small size spray droplets, that is, spray droplets having a droplet size below a given value, typically, a droplet size of less than 150 micrometers ("µm"). Spray drift of pesticides can have undesirable consequences, such as for example, unintended contact of phytotoxic pesticides with non-pest plants, such as crops or ornamental plants, with damage to such non-pest plants.

In one embodiment, spray drift can be measured as follows: the aqueous pesticide compositions as described herein are sprayed through a nozzle under certain conditions, for example, a single, stationary XR11002 flat fan nozzle (Teejet) with an output of 0.64 liter $in^{-1}$ at a pressure of 30 psi (~2 bar) in a flow-controlled hood (speed ~1.6 MPH), and a droplet size distribution was measured perpendicular to the plane of spray pattern and below the nozzle tip, e.g., 35 cm. An analyzer such as a HELOS VARIO particle size analyzer (Sympatec) can be used to measure the spray droplets using a R7 lens. The volume mean diameter ("VMD") of the spray droplets, expressed in micrometers ("µm"), and relative amount, expressed as percent by volume of the total spray volume ("vol %"), of droplets below 150 µm can be ascertained. It is desireable for spray compositions to exhibit a smaller amount of small size spray droplets that are very susceptible to spray drift, i.e., droplets below 150 µm in size, compared to respective analogous compositions or compositions without a drift control agent.

A composition of the invention may comprise any compound useful as drift control agent.

Water soluble polymers and fatty deposition control agents as described below are typical examples of suitable drift control agents according to the present invention.

Suitable drift contol agents include water soluble polysaccharide polymers, for example, galactomannans such as guars, including guar derivatives, xanthans, polyfructoses such as levan, starches, including starch derivatives, such as amylopectin, and cellulose, including cellulose derivatives, such as methylcellulose, ethylcellulose, carboxymethylcellulose, hydroxyethylcellulose, cellulose acetate, cellulose acetate butyrate, and cellulose acetate propionate.

Galactomannans are polysaccharides consisting mainly of the monosaccharides mannose and galactose. The mannose-elements form a chain consisting of many hundreds of (1,4)-ß-D-mannopyranosyl-residues, with 1,6 linked ß-D-galactopyranosyl-residues at varying distances, dependent on the plant of origin. Naturally occurring galactomannans are available from numerous sources, including guar gum, guar splits, locust bean gum and tara gum. Additionally, galactomannans may also be obtained by classical synthetic routes or may be obtained by chemical modification of naturally occurring galactomannans.

Guar gum refers to the mucilage found in the seed of the leguminous plant Cyamopsis tetragonolobus. The water soluble fraction (85%) is called "guaran," which consists of linear chains of (1,4)-.β-D mannopyranosyl units—with α-D-galactopyranosyl units attached by (1,6) linkages. The ratio of D-galactose to D-mannose in guaran is about 1:2. Guar gum typically has a weight average molecular weight of between 2,000,000 and 5,000,000 g/mol. Guars having a reduced molecular weight, such as for example, from about 50,000 to about 2,000,000 g/mol are also known.

Guar seeds are composed of a pair of tough, non-brittle endosperm sections, hereafter referred to as "guar splits," between which is sandwiched the brittle embryo (germ). After dehulling, the seeds are split, the germ (43-47% of the seed) is removed by screening, and the splits are ground. The ground splits are reported to contain about 78-82% galactomannan polysaccharide and minor amounts of some proteinaceous material, inorganic salts, water-insoluble gum, and cell membranes, as well as some residual seedcoat and embryo.

Locust bean gum or carob bean gum is the refined endosperm of the seed of the carob tree, Ceratonia siliqua. The ratio of galactose to mannose for this type of gum is about 1:4. Locust bean gum is commercially available.

Tara gum is derived from the refined seed gum of the tara tree. The ratio of galactose to mannose is about 1:3. Tara gum is commercially available.

In one embodiment, native (i.e. not derivatized) polysaccharide gums, such as for instance native guar gum, cassia gum or tamarind seed gum, are suitable drift control agents according to the present invention.

Other galactomannans of interest are the modified galactomannans, including derivatized guar polymers, such as carboxymethyl guar, carboxymethylhydroxypropyl guar, cationic hydroxpropyl guar, hydroxyalkyl guar, including hydroxyethyl guar, hydroxypropyl guar, hydroxybutyl guar and higher hydroxylalkyl guars, carboxylalkyl guars, including carboxymethyl guar, carboxylpropyl guar, carbon/butyl guar, and higher carboxyalkyl guars, the hydroxyethylated, hydroxypropylated and carboxymethylated derivative of guaran, the hydroxethylated and carboxymethylated derivatives of carubin, and the hydroxypropylated and carboxymethylated derivatives of cassia-gum.

Xanthans of interest are xanthan gum and xanthan gel. Xanthan gum is a polysaccharide gum produced by Xathomonas campestris and contains D-glucose, D-mannose, D-glucuronic acid as the main hexose units, also contains pyruvate acid, and is partially acetylated.

Levan is a polyfructose comprising 5-membered rings linked through β-2,6 bonds, with branching through β2,1 bonds. Levan exhibits a glass transition temperature of 138° C. and is available in particulate form. At a molecular weight of 1-2 million, the diameter of the densely-packed spherulitic particles is about 85 nm.

Modified celluloses are celluloses containing at least one functional group, such as a hydroxy group, hydroxycarboxyl group, or hydroxyalkyl group, such as for example, hydroxymethyl cellulose, hydroxyethyl celluloses, hydroxypropyl celluloses or hydroxybutyl celluloses.

Processes for making derivatives of guar gum splits are generally known. Typically, guar splits are reacted with one or more derivatizing agents under appropriate reaction conditions to produce a guar polysaccharide having the desired substituent groups. Suitable derivatizing reagents are commercially available and typically contain a reactive functional group, such as an epoxy group, a chlorohydrin group, or an ethylenically unsaturated group, and at least one other substituent group, such as a cationic, nonionic or anionic substituent group, or a precursor of such a substituent group per molecule, wherein substituent group may be linked to the reactive functional group of the derivatizing agent by bivalent linking group, such as an alkylene or oxyalkylene group. Suitable cationic substituent groups include primary, secondary, or tertiary amino groups or quaternary ammonium, sulfonium, or phosphinium groups. Suitable nonionic substituent groups include hydroxyalkyl groups, such as hydroxypropyl groups. Suitable anionic groups include carboxyalkyl groups, such as carboxymethyl groups. The cationic, nonionic and/or anionic substituent groups may be introduced to the guar polysaccharide chains via a series of reactions or by simultaneous reactions with the respective appropriate derivatizing agents.

The guar may be treated with a crosslinking agent, such for example, borax (sodium tetra borate) is commonly used as a processing aid in the reaction step of the water-splits process to partially crosslink the surface of the guar splits and thereby reduces the amount of water absorbed by the guar splits during processing. Other crosslinkers, such as, for example, glyoxal or titanate compounds, are known.

In one embodiment, the drift control agent of the present invention is a non-derivatized galactomannan polysaccharide, more typically a non-derivatized guar gum. It is understood that the term "non-derivatized guar gum" is synonymous, and used interchangeably, with the terms "native guar" or "guar gum".

In one embodiment, the drift control agent is a derivatized galactomannan polysaccharide that is substituted at one or more sites of the polysaccharide with a substituent group that is independently selected for each site from the group consisting of cationic substituent groups, nonionic substituent groups, and anionic substituent groups.

In one embodiment, the drift control agent of the present invention is derivatized galactomannan polysaccharide, more typically a derivatized guar. Suitable derivatized guars include, for example, hydroxypropyl trimethylammonium guar, hydroxypropyl lauryldimethylammonium guar, hydroxypropyl stearyldimethylammonium guar, hydroxypropyl guar, carboxymethyl guar, guar with hydroxypropyl groups and hydroxypropyl trimethylammonium groups, guar with carboxymethyl hydroxypropyl groups and mixtures thereof.

The amount of derivatizing groups in a derivatized polysaccharide polymer may be characterized by the degree of substitution of the derivatized polysaccharide polymer or the molar substitution of the derivatized polysaccharide polymer.

As used herein, the terminology "degree of substitution" in reference to a given type of derivatizing group and a given polysaccharide polymer means the number of the average number of such derivatizing groups attached to each monomeric unit of the polysaccharide polymer. In one embodiment, the derivatized galactomannan polysaccharide exhibits a total degree of substitution ("$DS_T$") of from about 0.001 to about 3.0, wherein:

$DS_T$ is the sum of the DS for cationic substituent groups ("$DS_{cationic}$"), the DS for nonionic substituent groups ("$DS_{nonionic}$") and the DS for anionic substituent groups ("$DS_{anionic}$"), $DS_{cationic}$ is from 0 to about 3, more typically from about 0.001 to about 2.0, and even more typically from about 0.001 to about 1.0, $DS_{nonionic}$ is from 0 to 3.0, more typically from about 0.001 to about 2.5, and even more typically from about 0.001 to about 1.0, and $DS_{anionic}$ is from 0 to 3.0, more typically from about 0.001 to about 2.0.

As used herein, the term "molar substitution" or "ms" refers to the number of moles of derivatizing groups per moles of monosaccharide units of the guar. The molar substitution can be determined by the Zeisel-GC method. The molar substitution utilized by the present invention is typically in the range of from about 0.001 to about 3.

In one embodiment, the drift control agent is a water soluble non-polysaccharide polymer. Suitable water soluble non-polysaccaharide polymers include, for example, lecithin polymers, poly(alkyleneoxide) polymers, such as poly(ethylene oxide) polymers, and water soluble polymers derived from ethylenically unsaturated monomers. Suitable water soluble polymers derived from ethylenically unsaturated monomers include water soluble polymers derived from acrylamide, methacrylamide, 2-hydroxy ethyl acrylate, and/or N-vinyl pyrrolidone, dimethylacrylamides (DMA), acrylamidomethylpropanesulfonic acids (AMPS), acrylic acids (AA), including homopolymers of such monomers, such as poly(acrylamide) polymers and poly(vinyl pyrrolidone) polymers, as well as copolymers of such monomers with one or more comonomers. Suitable water soluble copolymers derived from ethylenically unsaturated monomers include water soluble cationic polymers made by polymerization of at least one cationic monomer, such as a diamino alkyl (meth)acrylate or diamino alkyl (meth)acrylamide, or mixture thereof, and one or more nonionic monomers, such as acrylamide or methacrylamide. In one embodiment, the non-polysaccharide polymer exhibits a weight average molecular weight of greater than about 1,000,000 g/mol, more typically greater than about 2,000,000 g/mol to about 20,000,000 g/mol, more typically to about 10,000,000 g/mol.

In one embodiment, the drift control agent comprises, for example, galactomannans such as guars, including guar derivatives, polyfructoses such as levan, starches, including starch derivatives, such as amylopectin, xyloglucans such as tamarind gum and tamarind gum derivatives such as hydroxypropyl tamarind gum, and cellulose, including cellulose derivatives, such as methylcellulose, ethylcellulose, carboxymethylcellulose, hydroxyethylcellulose, cellulose acetate, cellulose acetate butyrate, and cellulose acetate propionate, as well as cassia gum.

Tamarind (Tamahndus Indica) is a leguminous evergreen tall tree produced in the tropics. Tamarind gum (tamarind powder or tamarind kernel powder), a xyloglucan polysaccharide, is obtained by extracting and purifying the seed powders, obtained by grinding the seeds of tamarind. The polysaccharide molecule of the tamarind gum consists of a main linear chain of poly-glucose bearing xylose and galactoxylose substituents.

In another embodiment, the drift control agent of the present invention is derivatized xyloglucan polysaccharide, more typically a derivatized tamarind.

Suitable derivatized tamarinds include, for instance, hydroxypropyl tamarind gum, which may further contain substituent groups such as carboxyalkyl substituents (e.g. carboxymethyl or carboxyethyl) or hydrophobic substituents (e.g. C4-C24 linear or branched alkyl chains), such as those described in WO2016/124467, which is incorporated by reference.

According to another one of the invention embodiments, the drift control agent is a cationic tamarind gum derivative, for instance a cationic tamarind gum derivative having a cationic degree of substitution DScat ranging from about 0.001 to about 3.

According to one embodiment, in particular when the drift control agent is a tamarind gum derivative, such as a tamarind seed gum polymer, for instance a hydroxypropyl tamarind, the pesticide composition of the invention does not comprise a combination of dipotassium phosphate and tri-potassium citrate.

According to another embodiment, in particular when the drift control agent is a tamarind gum derivative, such as a tamarind seed gum polymer, for instance a hydroxypropyl tamarind, the pesticide composition of the invention does not comprise a combination of di-potassium phosphate, potassium nitrate and tri-potassium citrate.

In another embodiment, the drift control agent is present in an amount having a lower limit, based on 100 pbw of aqueous solution or composition, of 0.5 pbw, or of 1 pbw, or in another embodiment of 1.2 pbw, or in another embodiment, 1.4 pbw, or in another embodiment, 1.6 pbw, or in another embodiment, 1.8 pbw, or in yet another further embodiment, 2 pbw, or in another embodiment, 2.4 pbw, or in a further embodiment, 3 pbw, or in another embodiment, 3.5 pbw, or in another embodiment, 3.8 pbw, or in another embodiment, 4 pbw, or in another embodiment, 4.5 pbw, or one embodiment, 5 pbw, or in another embodiment, 7 pbw, or in a further embodiment, 8 pbw, or in another embodiment, 10 pbw, or in yet another embodiment, 12 pbw, or in another embodiment, 16 pbw, or in another embodiment, 20 pbw. In one particular embodiment, the water-soluble polymer is present in an amount having a lower limit, based on 100 pbw of aqueous solution or composition, of 1.8 pbw. In one particular embodiment, the drift control agent, for instance the water-soluble polymer, is present in an amount having a lower limit, based on 100 pbw of aqueous solution or composition, of 3.8 pbw. In one particular embodiment, the drift control agent, for instance the water-soluble polymer, is present in an amount having a lower limit, based on 100 pbw of aqueous solution or composition, of 4 pbw. In one particular embodiment, the the drift control agent, for instance the water-soluble polymer, is present in an amount having a lower limit, based on 100 pbw of aqueous solution or composition, of 2 pbw.

In yet another embodiment, the the drift control agent, for instance the water-soluble polymer, is present in an amount having an upper limit, based on 100 pbw of aqueous solution or composition, of 20 pbw, or in another embodiment of 18 pbw, or in another embodiment, 17 pbw, or in another embodiment, 16 pbw, or in another embodiment, 14 pbw, or in yet another further embodiment, 13 pbw, or in another embodiment, 12 pbw, or in a further embodiment, 10 pbw, or in another embodiment, 9 pbw, or in another embodiment, 8 pbw, or in another embodiment, 7 pbw, or in another embodiment, 6 pbw, or one embodiment, 5.5 pbw, or in another embodiment, 5 pbw, or in a further embodiment, 4.5 pbw, or in another embodiment, 3 pbw, or in yet another embodiment, 2.5 pbw, or in another embodiment, 2.2 pbw. In one particular embodiment, the drift control agent, for instance the water-soluble polymer, is present in an amount having an upper limit, based on 100 pbw of aqueous solution or composition, of 12 pbw. In one particular embodiment, the drift control agent, for instance the water-soluble polymer, is present in an amount having an upper limit, based on 100 pbw of aqueous solution or composition, of 8 pbw. In one particular embodiment, the drift control agent, for instance the water-soluble polymer, is present in an amount having an upper limit, based on 100 pbw of aqueous solution or composition, of 20 pbw.

According to anyone of the invention embodiments, a composition of the invention may comprise greater than about 1 wt % of a drift control agent suspended in a liquid medium, for instance greater than about 2 wt %, for instance greater than about 3 wt %, for instance greater than about 4 wt %, for instance at least 5 wt % of a drift control agent, for instance an incompletely hydrated water-soluble polymer, suspended in a liquid medium.

Fatty deposition control agents are also suitable as drift control agents in a composition of the invention.

In particular, emulsified fatty deposition control agents, in particular combinations of a fatty deposition control agent and of a surfactant as described below, may be used according to the invention.

Any known emulsifying surfactant can be combined to a fatty deposition control agent of the invention to obtain an emulsified fatty deposition control agent useful as drift control agent according to the present invention.

Fatty compounds suitable as the fatty deposition control agent as described herein are typically insoluble in water and form a two phase mixture with water in all proportions.

In one embodiment, the fatty deposition control agent comprises one or more fatty alkanes, fatty acids, fatty amines, fatty amides, fatty glycerides, fatty triglycerides, fatty acid esters, or any mixture thereof. In another embodiment, the fatty deposition control agent comprises one or more fatty alkanes, fatty acids, fatty amides, fatty glycerides, or any mixture thereof. For example, the fatty deposition control agent, in one embodiment, is a mixture of a fatty acid and a fatty triglyceride. In another embodiment, the fatty deposition control agent comprises one or more fatty alkanes. In another embodiment, the fatty deposition control agent comprises one or more fatty acids. In another embodiment, the fatty deposition control agent comprises one or more fatty glycerides. In another embodiment, the fatty deposition control agent comprises one or more fatty triglycerides. In another embodiment, the fatty deposition control agent comprises one or more fatty acid esters. In another embodiment, the fatty deposition control agent comprises one or more fatty amines. In another embodiment, the fatty deposition control agent comprises one or more fatty amides.

Suitable glycerides are mono- di-, and/or tri-esters of glycerol with one or more fatty acids. In one embodiment, the fatty deposition control agent comprises one or more fatty glycerides, which may comprise one or more fatty monoglycerides, fatty diglycerides, fatty triglycerides, or a mixture thereof. In one embodiment, the one or more fatty triglycerides are present in an amount ranging from 0.001% to 5% by weight of composition. In another embodiment, the one or more fatty triglycerides are present in an amount ranging from 0.01% to 3% by weight of composition. The composition in one embodiment is an adjuvant composition, while in a further embodiment the composition is a concentrated pesticide composition, while in yet another embodiment the composition is an end-use pesticide composition. In one particular embodiment, the one or more fatty triglycerides, when incorporated into an adjuvant composition, are present in an amount greater than 1% by weight of adjuvant composition. In another embodiment, the one or more fatty triglycerides, when incorporated into an adjuvant composition, are present in an amount greater than 25% by weight of adjuvant composition, or in an amount greater than 40% by weight of adjuvant composition, or in an amount greater than 50% by weight of adjuvant composition, or in an amount greater than 70% by weight of adjuvant composition.

In one embodiment, the fatty glyceride or triglyceride comprises one or more compounds according to structure (IIa)

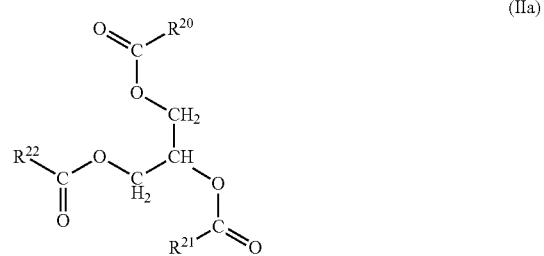

(IIa)

Wherein $R^{20}$, $R^{21}$, and $R^{22}$ are each independently H, $(C_6-C_{30})$alkyl, $(C_{10}-C_{24})$alkyl, or $(C_6-C_{30})$alkenyl, more typically $(C_{10}-C_{24})$alkenyl. In one embodiment, $R^{20}$, $R^{21}$, and $R^{22}$ are each independently $(C_{14}-C_{18})$alkyl. In one embodiment, $R^{20}$, $R^{21}$, and $R^{22}$ are each independently $(C_{10}-C_{24})$alkyl. In one embodiment, $R^{20}$, $R^{21}$, and $R^{22}$ are each independently $(C_{16}-C_{18})$alkyl. In one embodiment, $R^{20}$, $R^{21}$, and $R^{22}$ are each independently $(C_6-C_{30})$alkyl. In one embodiment, $R^{20}$, $R^{21}$, and $R^{22}$ are each independently $(C_6-C_{30})$alkenyl. In one embodiment, $R^{20}$, $R^{21}$, and $R^{22}$ are each independently $(C_{10}-C_{24})$alkenyl. $R^{20}$, $R^{21}$, and $R^{22}$ may each be linear or branched and may each, optionally, be substituted on one or more carbon atoms with hydroxyl, and provided that at least one of $R^{20}$, $R^{21}$, and $R^{22}$ is not H.

Alkyl moieties suitable as groups of structure (IIa) include, for example, $(C_4-C_{30})$hydrocarbon group.

Alkenyl moieties suitable as groups of structure (IIa) may be mono-unsaturated or poly-unsaturated.

In one embodiment, the fatty glyceride comprises one or more fatty monoglyceride compounds according to structure (IIa) wherein two of $R^{20}$, $R^{21}$ and $R^{22}$ are each independently H and the remaining one of $R^{20}$, $R^{21}$ and R22 is $(C_6-C_{30})$alkyl, more typically $(C_6-C_{24})$alkyl, or $(C_6-C_{30})$alkenyl, more typically $(C_8-C_{24})$alkenyl.

In one embodiment, the fatty glyceride comprises one or more fatty diglyceride compounds according to structure (IIa) wherein two of $R^{20}$, $R^{21}$ and $R^{22}$ are each independently $(C_6-C_{30})$alkyl, more typically $(C_6-C_{24})$alkyl, or $(C_6-C_{30})$alkenyl, more typically $(C_8-C_{24})$alkenyl, and the remaining one of $R^{20}$, $R^{21}$ and $R^{22}$ is H.

In one embodiment, the fatty glyceride comprises one or more fatty triglyceride compounds according to structure (IIa) wherein $R^{20}$, $R^{21}$, and $R^{22}$ are each independently $(C_6-C_{24})$alkyl, more typically $(C_6-C_{24})$alkyl, or $(C_8-C_{24})$alkenyl, more typically $(C_8-C_{24})$alkenyl. In one embodiment $R^{20}$, $R^{21}$, and $R^{22}$ are each independently a linear or branched $(C_4-C_{30})$alkyl, more typically, linear or branched $(C_8-C_{24})$alkyl, even more typically linear or branched $(C_{12}-C_{22})$alkyl, or $(C_5-C_{24})$cycloalkyl, or linear or branched $(C_4-C_{30})$alkenyl, more typically, linear or branched $(C_8-C_{24})$alkenyl, even more typically linear or branched $(C_{12}-C_{22})$alkenyl, or $(C_5-C_{24})$cycloalkenyl, or $(C_4-C_{30})$alkaryl, more typically $(C_8-C_{24})$alkaryl, or $(C_4-C_{30})$aralkyl, more typically $(C_8-C_{24})$aralkyl. In one embodiment, $R^{20}$, $R^{21}$, and $R^{22}$ are each independently a linear or branched $(C_4-C_{30})$alkyl; or in another embodiment is a linear or branched $(C_8-C_{24})$alkyl; or in another embodiment is a linear or branched $(C_{12}-C_{22})$alkyl; or in another embodiment is a $(C_5-C_{24})$cycloalkyl; or in another embodiment is a linear or branched $(C_4-C_{30})$alkenyl; or in another embodiment is a linear or branched $(C_8-C_{24})$alkenyl; or in another embodiment is a linear or branched $(C_{12}-C_{22})$alkenyl; or in another embodiment is a $(C_5-C_{24})$cycloalkenyl; or in another embodiment is a $(C_4-C_{30})$alkaryl; or in another embodiment is a $(C_8-C_{24})$alkaryl, or $(C_4-C_{30})$aralkyl, more typically $(C_8-C_{24})$aralkyl.

In one embodiment, the fatty glyceride or triglyceride comprises one or more compounds according to structure (II):

(II)

wherein:

$R^{20}$, $R^{21}$, and $R^{22}$ are each independently H, carboxy$(C_6-C_{30})$alkyl, more typically carboxy$(C_{10}-C_{24})$alkyl, or carboxy$(C_6-C_{30})$alkenyl, more typically carboxy$(C_{10}-C_{24})$alkenyl. In one embodiment, $R^{20}$, $R^{21}$, and $R^{22}$ are each independently carboxy$(C_{14}-C_{18})$alkyl. In one embodiment, $R^{20}$, $R^{21}$, and $R^{22}$ are each independently carboxy$(C_{10}-C_{24})$alkyl. In one embodiment, $R^{20}$, $R^{21}$, and $R^{22}$ are each independently carboxy$(C_{16}-C_{18})$alkyl. In one embodiment, $R^{20}$, $R^{21}$, and $R^{22}$ are each independently carboxy$(C_6-C_{30})$alkyl. In one embodiment, $R^{20}$, $R^{21}$, and $R^{22}$ are each independently carboxy$(C_6-C_{30})$alkenyl. In one embodiment, $R^{20}$, $R^{21}$, and $R^{22}$ are each independently carboxy$(C_{10}-C_{24})$alkenyl. The alkyl portions of the respective carboxyalkyl groups and the alkenyl portions of the respective carboxyalkenyl groups may each be linear or branched and may each, optionally, be substituted on one or more carbon atoms with hydroxyl, and provided that at least one of $R^{20}$, $R^{21}$, and $R^{22}$ is not H.

Alkyl moieties suitable as the alkyl portion of the carboxyalkyl groups of structure (II) include, for example, $(C_4-C_{30})$hydrocarbon group.

Alkenyl moieties suitable as the alkenyl portion of the carboxyalkenyl groups of structure (II) may be mono-unsaturated or poly-unsaturated.

In one embodiment, the fatty glyceride comprises one or more fatty monoglyceride compounds according to structure (II) wherein two of $R^{20}$, $R^{21}$ and R22 are each independently H and the remaining one of $R^{20}$, $R^{21}$ and $R^{22}$ is carboxy$(C_6-C_{30})$alkyl, more typically carboxy$(C_6-C_{24})$alkyl, or carboxy$(C_6-C_{30})$alkenyl, more typically carboxy$(C_8-C_{24})$alkenyl.

In one embodiment, the fatty glyceride comprises one or more fatty diglyceride compounds according to structure (II) wherein two of $R^{20}$, $R^{21}$ and $R^{22}$ are each independently carboxy$(C_6-C_{30})$alkyl, more typically carboxy$(C_6-C_{24})$alkyl, or carboxy$(C_6-C_{30})$alkenyl, more typically carboxy$(C_8-C_{24})$alkenyl, and the remaining one of $R^{20}$, $R^{21}$ and $R^{22}$ is H.

In one embodiment, the fatty glyceride comprises one or more fatty triglyceride compounds according to structure (II) wherein $R^{20}$, $R^{21}$, and $R^{22}$ are each independently carboxy$(C_6-C_{24})$alkyl, more typically carboxy$(C_6-C_{24})$alkyl, or carboxy$(C_8-C_{24})$alkenyl, more typically carboxy$(C_8-C_{24})$alkenyl.

In one embodiment, the fatty glyceride is a mixture comprising at least one fatty monoglyceride compound and at least one fatty diglyceride compound, or at least one fatty monoglyceride compound and at least one fatty triglyceride compound, or at least fatty diglyceride compound and at least one fatty triglyceride compound, or at least one fatty monoglyceride compound, at least one fatty diglyceride compound, and at least one fatty triglyceride compound.

Suitable sources of fatty glycerides include naturally occurring mixtures of fatty glycerides and which may further comprise one or more fatty acids, such as vegetable oils, including, for example, palm oil, soybean oil, rapeseed oil, high erucic acid rapeseed oil, sunflower seed oil, peanut oil, cottonseed oil, palm kernel oil, linseed oil, coconut oil, olive oil, safflower oil, sesame oil, tung oil, canola oil, castor oil, meadowfoam seed oil, hemp oil, as well as mixtures of such oils.

Suitable fatty acid glycol ester surfactants include glycol fatty acid monoesters and glycol fatty acid diesters, more typically mono- and di-esters of glycol s and saturated or unsaturated $(C_8-C_{22})$, more typically $(C_{12}-C_{18})$, fatty acids and mixtures thereof, even more typically mono- and di-esters of poly(ethylene glycol) or poly(propylene glycol) and saturated or unsaturated $(C_8-C_{22})$, more typically $(C_{12}-C_{18})$, fatty acids and mixtures thereof, such as for example, poly(ethylene glycol) monomyristates, poly(ethylene glycol) monostearates, poly(ethylene glycol) distearates, poly (ethylene glycol) monooleates, poly(ethylene glycol) dioleates poly(propylene glycol) monooleates, and poly (ethylene glycol) linolenates, poly(ethylene glycol) dibehenates, poly(ethylene glycol) monobehenates poly(ethylene glycol) monoerucates.

In one embodiment, the drift control agent comprises a fatty deposition control agent comprising one or more fatty glycerides, more typically vegetable oils, and one or more surfactants selected from fatty acid glycol ester surfactants.

In one particular embodiment, a concentrated composition of the invention may comprise a fatty deposition control agent as described previously in an amount greater than 1% by weight of composition, for instance in an amount ranging from 1% by weight to 50% by weight, in particular from 5% by weight to 30% by weight, for instance from 10% by weight to 25% by weight, relative to the total weight of the composition.

According to anyone of the invention embodiments, a composition of the invention may optionally further comprise at least one hydration inhibitor component.

As used herein, the term "hydration" in reference to the drift control agent or water soluble polymer component of the present invention means association of substituent groups, typically hydrophilic substituent groups, such as hydroxyl groups, of the water soluble polymer with water molecules, such as water molecules of the aqueous medium through, for example, hydrogen bonding. The degree to which the drift control agent or water soluble polymer is hydrated can range from non-hydrated to completely hydrated, with degrees of partial hydration extending between the two extremes. As discussed more fully below, the drift control agent or water soluble polymer is capable of contributing to the viscosity of the composition of the present invention with the magnitude of the contribution being dependent on the degree of hydration of the water soluble polymer. The degree of hydration of the water soluble polymer can thus be characterized based on the magnitude of the contribution that the water soluble polymer makes to the viscosity of the composition:

(a) As referred to herein a "non-hydrated" water soluble polymer makes no significant contribution to the viscosity of the composition. In general, the non-hydrated water soluble polymer would be in the form of a discontinuous phase, for example, discrete particles, that is dispersed in a continuous phase of the liquid medium, ideally with no interaction between the hydrophilic substituents of the polymer and any water molecules present in the liquid medium. In the case of an aqueous medium, there will generally be at least some interaction between the hydrophilic groups of polymer and water molecules of the aqueous medium at interfaces between the phases, for example, at the outer surfaces of the particles. It is believed that in the case of a non-hydrated water soluble polymer, interaction among the hydrophilic substituent groups of the non-hydrated water soluble polymer dominates over interaction between the hydrophilic substituent groups of the polymer and any water molecules present in the aqueous medium, the polymer chains of the non-hydrated water soluble polymer are in a compact, folded conformation, and, in the case where the liquid medium is an aqueous medium, the non-hydrated water soluble polymer is not dissolved in the aqueous medium and remains in the form of a discontinuous phase dispersed in the continuous phase of the aqueous medium.

(b) As referred to herein, a "completely hydrated" water soluble polymer makes the maximum contribution to the viscosity of the composition that the water soluble polymer is capable of making. It is believed that in a completely hydrated water soluble polymer, association between the hydrophilic substituent groups of the water soluble polymer and water molecules dominates over interaction among the hydrophilic substituent groups, that the polymer chains of a completely hydrated water soluble polymer are thus in an unfolded, random coil conformation, and in the case where the liquid medium is an aqueous medium, the aqueous medium and completely hydrated water soluble polymer form a single phase, that is, the completely hydrated water soluble polymer is dissolved in the aqueous medium.

(c) As referred to herein, a "partially hydrated" water soluble polymer is a water soluble polymer wherein some of the hydrophilic substituent groups of the polymer are associated with water molecules. At a relatively low level of hydration, the partially hydrated water soluble polymer makes a relatively small contribution to the viscosity of the composition, while at a relatively high level of hydration, the viscosity contribution of a given amount of a partially hydrated water soluble polymer in a given medium approaches, but is less than, the maximum contribution that the amount of water soluble polymer is capable of making in that medium when completely hydrated. It is believed that with increasing hydration, particles of the water soluble polymer swell, an increasing number of hydrophilic substituent groups of the water soluble polymer, including hydrophilic substituent groups within the mass of swollen water soluble polymer, become associated with water molecules, and, as complete hydration is approached, the water soluble polymer chains progressively unfold and approach an unfolded, randomly coiled configuration.

"Non-hydrated" and "partially hydrated" are collectively referred to herein as "incompletely hydrated". A "hydration inhibitor", as referred to herein is any compound that may be added to an aqueous medium to inhibit hydration of a water soluble polymer in the aqueous medium.

The degree of hydration of the water soluble polymer can be characterized by viscosity measurements. For example, the viscosity of a given amount of a water soluble polymer, in a given amount of an aqueous medium, in the presence of a given amount of a proposed hydration inhibitor, and under given shear conditions, as described in more detail below (the "test composition"), can be compared to the viscosity of the same amount of the water soluble polymer in the same amount of the aqueous medium in the absence of the proposed hydration inhibitor (the "baseline composition"). If the viscosity of the test composition is equal to that of the baseline composition, then the water soluble polymer of the test composition is deemed to be completely hydrated (and the proposed hydration inhibitor is ineffective in the amount tested to inhibit hydration of the polymer). If the viscosity of the test composition is less than that of the baseline composition, then the water soluble polymer of the test composition is deemed to be incompletely hydrated (and the proposed hydration inhibitor is effective in the amount tested to inhibit hydration of the polymer).

In one embodiment, the incompletely hydrated water soluble polymer comprises solid particles of the water soluble polymer. The presence of such particles can be detected by various means, such as for example, by viewing a sample of the composition of the present invention under an optical microscope.

In one embodiment, the liquid medium is an aqueous liquid medium and at least a portion of the water soluble polymer is in the form of particles of the water soluble polymer. In one embodiment, the liquid medium is an aqueous liquid medium, at least a portion of the water soluble polymer is in the form of particles of the water soluble polymer, and at least a portion of such particles are dispersed, more typically suspended, in the aqueous liquid medium. The presence of such particles in the composition of the present invention is detectable by, for example, optical microscopy.

In one embodiment, the composition of the present invention exhibits a viscosity of less than 10 Pa·s, more typically from about 0.1 to less than 10 Pa·s, and even more typically from about 0.1 to less than 5 Pa·s, at a shear rate of greater than or equal to 10 s$^{-1}$.

In one embodiment, the composition of the present invention exhibits a non-Newtonian "shear thinning" viscosity, that is, a viscosity that, within a given range of shear stress, decreases with increasing shear stress. Two general generally recognized categories of flow behavior, that is, plastic flow behavior and pseudoplastic flow behavior, each include shear thinning flow behavior.

In one embodiment, the composition of the present invention exhibits plastic flow behavior. As used herein, the term "plastic" in reference to flow behavior of a composition means the composition that exhibits a characteristic "yield strength", that is, a minimum shear stress required to initiate flow of the composition, and exhibits shear thinning behavior over some range of shear stress above the yield strength. A plastic composition exhibits no flow when subjected to shear stress below its yield strength, and flows when subjected to shear stress above its yield strength, wherein, over an intermediate range of shear stress above its yield strength, the composition typically exhibits a non-Newtonian viscosity that decreases with increasing shear stress, that is, shear thinning behavior, and, at shear stresses above the intermediate range of shear stress, the composition may exhibit a viscosity that does not vary with shear stress, that is, Newtonian flow behavior.

In one embodiment the composition of the present invention exhibits pseudoplastic flow behavior. As used herein, the term "pseudoplastic" in reference to the flow behavior of a composition means that the composition exhibits a viscosity that decreases with increasing shear stress, that is, shear thinning behavior.

In each case, a composition having plastic or pseudoplastic rheological properties resists flow at low shear stress, but that when subjected to an elevated shear stress, such as being shaken in a bottle or squeezed through an orifice, the composition flows and can be easily pumped, poured, or otherwise dispensed from a container. In general, sedimentation or storage condition is a low shear process, having a shear rate in the range of from about 10$^{-6}$ reciprocal seconds (1/s or, equivalently, s$^{-1}$) to about 0.01 s$^{-1}$ and pumping or pouring is a relatively high shear process with a shear rate in the range of greater than or equal to about 1 s$^{-1}$, more typically from 100 s$^{-1}$ to 10,000 s$^{-1}$, and even more typically, from 100 s$^{-1}$ to 1,000 s$^{-1}$.

In one embodiment, the hydration inhibitor is selected from surfactants, water soluble non-surfactant salts, water dispersible organic liquids, and mixtures thereof. The terminology "non-surfactant salts" as used herein means salts that are not anionic, cationic, zwitterionic or amphoteric surfactants includes active ingredients, such as pesticide salts, whose primary activity is other than modification of interfacial surface tension. The terminology "water dispersible organic liquids" includes water miscible organic liquids and water immiscible organic liquids that may be dispersed in water, such as for example, in the form of an emulsion of the water immiscible organic liquid in water. In one embodiment, the hydration inhibitor or hydration inhibitor component comprises a water dispersible organic liquid. Suitable water dispersible organic liquids include, for example, (C1-C18)alcohols, such as, for example, monohydric alcohols, such as methanol, ethanol, isopropanol, cetyl alcohol, stearyl alcohol, benzyl alcohol, oleyl alcohol, and polyhydric alcohols, such as, for example, 2-butoxyethanol, ethylene glycol, and glycerol, alkylether diols such as, for example, ethylene glycol monoethyl ether, propylene glycol monoethyl ether, and diethylene glycol monomethyl ether, and mixtures thereof.

In one embodiment, the hydration inhibitor component comprises choline chloride. In one embodiment, the hydration inhibitor is selected from glycol, a glycol derivative, a glycerol, a glycerol derivative, or any combination thereof.

Glycols, glycol derivatives, glycerols and/or glycerol derivatives include, but are not limited, to polyglycols, polyglycol derivatives, aliphatic dihydroxy (dihydric) alcohols, polypropylene glycol, triethylene glycol, glycol alkyl ethers such as dipropylene glycol methyl ether, diethylene glycol. In another embodiment, glycols, glycol derivatives, glycerols and/or glycerol derivatives include but are not limited to polyglycols such as polyethylene glycols (PEG) and polypropylene glycols. Glycols are represented by the general formula CnH2n(OH)2, where n is at least 2. Non-limiting examples of glycols include ethylene glycol (glycol), propylene glycol (1,2-propanediol), 1,4-butanediol, 1,5-pentanediol, 1,6-hexanediol, 1,7-heptanediol, 1,9-nonanediol, 1,10-decanediol, 1,8-octanediol, 1,3-propanediol, 1,3-butanediol, 1,4-butanediol, 2,3-butanediol, 2,4-pentanediol, 2,5-hexanediol, 4,5-octanediol and 3,4-hexanediol, neopenty glycol, pinacol, 2,2-diethyl-1,3-propanediol, 2-ethyl-1,3-hexanediol, 2-ethyl-2-butyl-1,3-propanediol, isobutylene glycol, 2,3-dimethyl-1,3-propanediol, 1,3-diphenyl-1,3-propanediol, 3-methyl-1,3-butanediol.

In another embodiment, glycols, glycol derivatives, glycerols and/or glycerol derivatives include but are not limited to glycol stearate, ethylene glycol monostearate, ethylene glycol distearate, ethylene glycol amido stearate, dilaurate glycol, propylene glycol monostearate, propylene glycol dicaprylate, propylene glycol dicaprate diacetate glycol, dipalmite glycol, diformate glycol, dibutyrate glycol, dibenzorate glycol, dipalmate glycol, dipropionate glycol, monoacetate glycol, monopalmitate glycol and monoformate glycol. In another embodiment, glycols, glycol derivatives, glycerols and/or glycerol derivatives also include polypropylene glycol, triethylene glycol, dipropylene glycol methyl ether, or diethylene glycol.

Polyglycol derivatives include but are not limited to polypropylene glycols, as well as polyethylene glycol (PEG) 200-6000 mono and dilaurates, such as, PEG 600 dilaurate, PEG 600 monolaurate, PEG 1000 dilaurate, PEG 1000 monolaurate, PEG 1540 dilaurate and PEG 1540 monolaurate, polyethylene glycol 200-6000 mono and dioleates, such as, PEG 400 monoleate, PEG 600 dioleate, PEG 600 monooleate, PEG 1000 monoleate, PEG 1540 dioleate, PEG 1540 monooleate and polyethylene glycol 200-6000 mono and distearates, such as, PEG 400 distearate, PEG 400 monostearate, PEG 600 distearate, PEG 600 monostearate, PEG 1000 distearate, PEG 1000 monostearate, PEG 1540 distearate, PEG 1540 monostearate and PEG 3000 monostearate.

Examples of glycerol derivatives include but are not limited to glycerol monolaurate, glycerol monostearate, glycerol distearate, glycerol trioleate, glycerol monooleate, glycerol dilaurate, glycerol dipalmitate, glycerol triacetate, glycerol tribenzoate, glycerol tributyrate, glycerol monopalmitate, glycerol trimyristate, glycerol trilaurate, glycerol tripalmitate and glycerol tristearate.

In one embodiment, the composition of the present invention exhibits a viscosity of less than 10 Pa·s, more typically from about 0.1 to less than 10 Pa·s, at a shear rate of greater than or equal to 10 s−1. In one embodiment, the composition of the present invention exhibits a viscosity of less than 7

Pa·s, more typically from about 0.1 to less than 7 Pa·s, at a shear rate of greater than or equal to 10 s−1. In one embodiment, the composition of the present invention exhibits a viscosity of less than 5 Pa·s, more typically from about 0.1 to less than 5 Pa·s, at a shear rate of greater than or equal to 10 s−1.

In one embodiment, such a viscosity profile equates to the composition being flowable, i.e., able to be pumped. This characteristic is an advantage as end use applications from a storage container typically prefer to pump components into the final application tank for crop application. For example, typically farmers will add components for a final tank mix into separate tanks, such as a tank for water, a tank for an adjuvant composition, a tank for a water conditioner, and have those components pumped into a final end use application tank.

In one embodiment, the composition of the present invention is prepared on an as needed basis and is sufficiently stable, that is, a quiescent sample of the composition shows no evidence, by visual inspection, of gravity driven separation, such as, separation into layers and/or precipitation of components, such as, for example, separation of incompletely hydrated water-soluble polymer from the liquid medium, within the anticipated time period. The time period, for example, can be one hour, more typically two hours, between preparation and use.

In one embodiment, the composition of the present invention exhibits good storage stability and a quiescent sample of the composition shows no evidence, by visual inspection, of gravity driven separation within a given time, such as, for example, one week, more typically, one month, even more typically 3 months, under given storage conditions, such as, for example, at room temperature. In another embodiment, the composition of the present invention exhibits good storage stability and a quiescent sample of the composition shows no evidence, by visual inspection, of gravity driven separation within a given time, which in one embodiment is one week, more typically, one month, even more typically 3 months, under high termperature storage conditions, e.g., greater than 50° C. In one embodiment, the composition of the present invention is shelf stable (i.e., exhibits at least part of the good storage stability as detailed above) at a temperature greater than 50° C. for at least 24 hours, or 48 hours, or in yet another embodiment, 72 hours.

In one embodiment, the composition of the present invention exhibits good storage stability and a quiescent sample of the composition shows no evidence, by visual inspection, of gravity driven separation within a given time, such as, for example, 24 hours, more typically, four days, even more typically, one week, under accelerated aging conditions at an elevated storage temperature of up to, for example, 54° C., more typically, 45° C.

In one embodiment, the pesticide composition of the present invention comprises:
(a) at least one an auxin herbicide or salt thereof
(b) a liquid medium,
(c) an incompletely hydrated drift control agent, which typically is a water-soluble polymer, more typically wherein at least a portion of a water-soluble polymer is in the form of particles of the water-soluble polymer, at least a portion of which are dispersed, more typically suspended in the liquid medium, and
(d) a suspending agent in an amount effective to impart shear thinning properties to the composition;
(e) optionally, a surfactant; and
(f) optionally, hydration inhibitor, which in one embodiment is a glycol, a glycol derivative, a glycerol, a glycerol derivative, or any combination thereof.

In one embodiment, the composition is concentrated blend of a at least one an auxin herbicide or salt thereof, a drift control agent and suspending agent, which composition is stable, has a low viscosity, is easily transportable, is pourable and pumpable under field conditions, and is dilutable with water under field conditions to form a dilute pesticide composition for spray application to target pests.

In one embodiment, the concentrated pesticide composition of the present invention is diluted with water, typically in a ratio of from 1:10 to 1:100 parts by weight pesticide concentrate composition: parts by weight water to form a dilute pesticide composition for spray application to target plants.

Optionally, other components, such as additional pesticide, polymer, surfactants, fertilizer, and/or other adjuvants, may be added to the dilute pesticide composition.

In one embodiment, the pesticide composition of the present invention is applied, in dilute form, to foliage of a target plant at a rate of from about 0.25 pint, more typically about 0.5 pint, to about 5 pints, even more typically from about 1 pint to about 4 pints, as expressed in terms of the above described pesticide concentrate embodiment of the pesticide composition of the present invention (that is, comprising, based on 100 pbw of such composition, up to about 70 pbw, more typically from about 10 to about 60 pbw, more typically from about 25 to about 55 pbw, pesticide) per acre.

In one embodiment, the pesticide composition is spray applied in dilute form via conventional spray apparatus to foliage of one or more target plants present on an area of ground at a rate of from about 1 gallon to about 20 gallons, more typically about 3 gallons to 20 gallons, of the above described diluted pesticide composition per acre of ground.

In one embodiment, a concentrated composition of the invention exhibits a Brookfield viscosity at 25° C. and at 20 rpm of less than or equal to about 5,000 centiPoise ("cP"), more typically of less than or equal to 2,500 cP, for example from about 10 to about 1,500, especially from about 10 to about 1,000 cP.

A concentrated composition of the invention exhibits good storage stability. The criteria for assessing storage stability are that the formulation remains substantially homogeneous in visual appearance during storage and does not separate into layers of mutually insoluble liquid phases and does not form any solid precipitate upon quiescent standing In one embodiment, the concentrated composition of the invention remains stable during storage at temperatures from −5° C. to 54° C. for greater than or equal to 7 days, more typically for greater than or equal to 14 days (adaptation of CIPAC test MT46.3).

The concentrated composition of the invention remains stable during storage at room temperature for more than or equal to 7 days, more typically for greater than or equal to 14 days and even more typically for greater than or equal to 30 days.

A concentrated composition of the invention also exhibits good dilution stability and/or provides a suitable dispersion.

The term "suitable dispersion" is intended to denote a dispersion after dilution in water (CIPAC standard waters A or D) which exhibits substantially no or little phase separation (sedimentation, creaming, etc)) over time, in particular when it is stored for 30 minutes in a water bath thermostatted at 30° C., preferably for 2 hours in a water bath thermostatted at 30° C. and ideally for 24 hours in a water bath thermostatted at 30° C. (adaptation of CIPAC test MT41 and MT184).

The concentrated composition of the invention may comprise additional pesticides in addition to the auxin herbicide.

Suitable additional pesticides are pesticides as defined below. Preferred additional pesticides are herbicides, such as
amino acid derivatives: bilanafos, glyphosate (e.g. glyphosate free acid, glyphosate ammonium salt, glyphosate isopropylammonium salt, glyphosate trimethylsulfonium salt, glyphosate potassium salt, glyphosate dimethylamine salt), glufosinate (e.g. glufosinate ammonium salt), sulfosate;
imidazolinones: imazamethabenz, imazamox, imazapic, imazapyr, imazaquin, imazethapyr;
phenoxy acetic acids: clomeprop, 2,4-dichlorophenoxyacetic acid (2,4-D), 2,4-DB, dichlorprop, MCPA, MCPA-thioethyl, MCPB, Mecoprop.

More preferred additional pesticides are glyphosate and glufosinate.

According to anyone of the invention embodiments, a concentrated composition of the invention may comprise, in addition to said water-soluble salt of an auxin herbicide, at least one water-soluble salt of at least one additional herbicide.

For instance, a concentrated composition of the invention may further comprise at least one water-soluble salt of glyphosate and/or at least one water-soluble salt of glufosinate.

According to anyone of the invention embodiments, the total amount of water-soluble salts (whether it be a water-soluble salt of said auxin herbicide alone or a combination of a water-soluble salt of said auxin herbicide with a water-soluble salt of an additional herbicide and/or with added water-soluble salt) may be of at least 300 g/L.

According to anyone of the invention embodiments, a concentrated composition of the invention may also comprise, in addition to said water-soluble salt of an auxin herbicide, at least one additional herbicide which is insoluble in said concentrated composition, for instance present in a dispersed form.

According to another one of the invention embodiments, a concentrated composition of the invention may also comprise, in addition to said water-soluble salt of an auxin herbicide, at least one additional herbicide present in a soluble form in a liquid medium different from the aqueous continuous phase and which is non-miscible in said aqueous phase, with said liquid medium being present in an emulsified form in said concentrated composition. Suspo-emulsions are typical examples of such compositions.

The concentrated composition of the invention may comprise auxiliaries, such as volatilization reduction additives, solvents, liquid carriers, surfactants, dispersants, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants.

Suitable solvents and liquid carriers are organic solvents, such as mineral oil fractions of medium to high boiling point, e.g. kerosene, diesel oil; oils of vegetable or animal origin; aliphatic, cyclic and aromatic hydrocarbons, e. g. toluene, paraffin, tetrahydronaphthalene, alkylated naphthalenes; alcohols, e.g. ethanol, propanol, butanol, benzylalcohol, cyclohexanol; glycols; DMSO; ketones, e.g. cyclohexanone; esters, e.g. lactates, carbonates, fatty acid esters, gamma-butyrolactone; fatty acids; phosphonates; amines; amides, e.g. N-methylpyrrolidone, fatty acid dimethylamides; and mixtures thereof.

Suitable surfactants are surface-active compounds, such as anionic, cationic, nonionic and amphoteric surfactants, block polymers, polyelectrolytes, and mixtures thereof. Such surfactants can be used as emusifier, dispersant, solubilizer, wetter, penetration enhancer, protective colloid, or adjuvant. Examples of surfactants are listed in McCutcheon's, Vol. 1: Emulsifiers & Detergents, McCutcheon's Directories, Glen Rock, USA, 2008 (International Ed. or North American Ed.).

Suitable anionic surfactants are alkali, alkaline earth or ammonium salts of sulfonates, sulfates, phosphates, carboxylates, and mixtures thereof. Examples of sulfonates are alkylarylsulfonates, diphenylsulfonates, alpha-olefin sulfonates, lignine sulfonates, sulfonates of fatty acids and oils, sulfonates of ethoxylated alkylphenols, sulfonates of alkoxylated arylphenols, sulfonates of condensed naphthalenes, sulfonates of dodecyl- and tridecylbenzenes, sulfonates of naphthalenes and alkylnaphthalenes, sulfosuccinates or sulfosuccinamates. Examples of sulfates are sulfates of fatty acids and oils, of ethoxylated alkylphenols, of alcohols, of ethoxylated alcohols, or of fatty acid esters. Examples of phosphates are phosphate esters. Examples of carboxylates are alkyl carboxylates, and carboxylated alcohol or alkylphenol ethoxylates.

Suitable nonionic surfactants are alkoxylates, N-subsituted fatty acid amides, amine oxides, esters, sugar-based surfactants, polymeric surfactants, and mixtures thereof. Examples of alkoxylates are compounds such as alcohols, alkylphenols, amines, amides, arylphenols, fatty acids or fatty acid esters which have been alkoxylated with 1 to 50 equivalents. Ethylene oxide and/or propylene oxide may be employed for the alkoxylation, preferably ethylene oxide. Examples of N-subsititued fatty acid amides are fatty acid glucamides or fatty acid alkanolamides. Examples of esters are fatty acid esters, glycerol esters or monoglycerides. Examples of sugar-based surfactants are sorbitans, ethoxylated sorbitans, sucrose and glucose esters or alkylpolyglucosides. Examples of polymeric surfactants are homo- or copolymers of vinylpyrrolidone, vinylalcohols, or vinylacetate. The alkoxylate of the formula (I) is not a nonionic surfactant within the meaning of this invention. Suitable cationic surfactants are quaternary surfactants, for example quaternary ammonium compounds with one or two hydrophobic groups, or salts of long-chain primary amines. Suitable amphoteric surfactants are alkylbetains and imidazolines. Suitable block polymers are block polymers of the A-B or A-B-A type comprising blocks of polyethylene oxide and polypropylene oxide, or of the A-B-C type comprising alkanol, polyethylene oxide and polypropylene oxide. Suitable polyelectrolytes are polyacids or polybases. Examples of polyacids are alkali salts of polyacrylic acid or polyacid comb polymers. Examples of polybases are polyvinylamines or polyethyleneamines.

Suitable adjuvants are compounds, which have a negligible or even no pesticidal activity themselves, and which improve the biological performance of the compound I on the target. Examples are surfactants, mineral or vegetable oils, and other auxiliaries. Further examples are listed by Knowles, Adjuvants and additives, Agrow Reports DS256, T&F Informa UK, 2006, chapter 5.

Suitable thickeners are for instance polysaccharides (e.g. xanthan gum, carboxymethylcellulose), anorganic clays (organically modified or unmodified), polycarboxylates, and silicates.

Suitable bactericides are bronopol and isothiazolinone derivatives such as alkylisothiazolinones, alkylchloroisothiazolinones and benzisothiazolinones.

Suitable anti-freezing agents are ethylene glycol, propylene glycol, urea and glycerin. Suitable anti-foaming agents are silicones, long chain alcohols, and salts of fatty acids.

Suitable colorants (e.g. in red, blue, or green) are pigments of low water solubility and water-soluble dyes. Examples are inorganic colorants (e.g. iron oxide, titan oxide, iron hexacyanoferrate) and organic colorants (e.g. alizarin-, azo- and phthalocyanine colorants).

In one embodiment, the composition of the invention is free or substantially free of ammonium-containing water conditioning agent, in particular ammonium sulfate.

The pesticide compositions of the invention may advantageously also be useful to reduce volatility of said auxin herbicide and off-site movement of said auxin herbicide.

Volatilization occurs when pesticide surface residues change from a solid or liquid to a gas or vapor after an application of a pesticide has occurred. Once airborne, volatile pesticides can move long distances off site (and in particular longer distances compared to spray drift).

Another object of the present invention is to provide auxin herbicide compositions having reduced volatility relative to currently available compositions, and preferably reduced-volatility compositions that exhibit no significant reduction in herbicidal effectiveness relative to currently available compositions.

Advantageously, it is believed that the compositions of the present invention provide enhanced protection from off-target crop injury while maintaining comparable herbicidal efficacy on auxin-susceptible plants located in the target area.

Impact on the auxin herbicide volatility can be measured by conventional means known to those skilled in the art.

For instance, volatilization of an auxin herbicide can be assessed as follows: an auxin herbicide composition is heated, causing the auxin herbicide to volatilize from said composition into the gas phase. Weight of residual auxin herbicide composition is recorded against time (through thermogravimetric analyses), allowing indirect measurement of volatilization of the auxin herbicide.

Some details or advantages of the invention will appear in the non-limitative examples below.

As stated above, problems arise if the pesticide composition does not form a stable emulsion or maintain homogeneity when diluted in water (typically the spray solution). For example, the spray solution or diluted pesticide concentrate, if unable to form a stable emulsion or maintain homogeneity, becomes unusable and cannot be spray applied (e.g., clogs up the lines from the spray tank to the nozzle, clogs up the nozzle).

Experiments

Example A

Formulation Optimization for Dicamba-DGA+Guar Systems

With native guar and PG as the chassis, experiments were set up with the goal to maximize storage stability performance.

In the first study, the incorporation of xanthan gum is evaluated for stability performance. To achieve acceptable dispersion of Xanthan gum in the continuous phase, PreGel of Xanthan Gum ("Xanthan Gum PreGel"=1.47% Xanthan Gum, 0.49% Preservative (1,2-benzisothiazolin-3-one) and water) was prepared first.

Referring to Table A, the loading level of the Xanthan gum pregel in the formula influences the viscosity of the final formulation. At a loading level of about 10% Xanthan Gum PreGel, the formulations are highly viscous. Reducing the pregel loading level to 5% improved the flow behavior properties of the formulation (easier flowable).

TABLE A

Effect of loading level of xanthan gum on performance

| Ingredient | S1424-111-01 wt. % | S1424-111-02 wt. % | S1424-111-03 wt. % | S1424-111-04 wt. % | S1424-111-05 wt. % | S1424-111-06 wt. % | S1424-111-07 wt. % | S1424-111-08 wt. % |
|---|---|---|---|---|---|---|---|---|
| Dicamba/DGA, 55% acid | 65.36 | 65.36 | 65.36 | 65.36 | 65.36 | 65.36 | 65.36 | 65.36 |
| silicone emulsion (antifoam agent) | 0.10 | 0.10 | 0.10 | 0.10 | 0.10 | 0.10 | 0.10 | 0.10 |
| Water | 5.86 | 5.86 | 5.86 | 5.86 | 5.86 | 5.86 | 5.86 | 5.86 |
| PG | 5.00 | 5.00 | 5.00 | 5.00 | 5.00 | 5.00 | 5.00 | 5.00 |
| Rhodacal N | 0.00 | 0.00 | 0.00 | 0.00 | 0.20 | 0.20 | 0.20 | 0.20 |
| Xanthan gum | 5.00 | 10.00 | 15.00 | 20.00 | 5.00 | 10.00 | 15.00 | 20.00 |
| Extra Water | 15.20 | 10.20 | 5.20 | 0.20 | 15.00 | 10.00 | 5.00 | 0.00 |
| Native Guar | 3.48 | 3.48 | 3.48 | 3.48 | 3.48 | 3.48 | 3.48 | 3.48 |
| Total | 100.00 | 100.00 | 100.00 | 100.00 | 100.00 | 100.00 | 100.00 | 100.00 |
| Appearance (final formulation, sonicated for 10 minutes) | Flowable, low viscosity; trace sediments observed | Flowable, high viscosity | viscous | partial gel | Flowable, low viscosity, no residue or sediments observed | Viscous; flowable | Partial gel | gel |

Addition experiments were initiated where the loading level of the Xanthan Pre-Gel was varied between 2-% (Referring to Table B). As noted in the property observation section, the final viscosities of the mixtures (as prepared, RT) are proportional to the loading level of xanthan gum, as expected. At 2% Xanthan Gum Pregel, the viscosity is 63 cP and the viscosity increases to 273 cP when the loading level of the Pregel is increased to 5%.

Short Term Stability Results of Xanthan Gum

While performance at room temperature was acceptable, all three formulations turned into semi-gel after they were stored in the 54° C. for one day (multiple pour-outs were required to re-homogenize the mixtures)

TABLE B

Effect of loading levels of xanthan gum on viscosity.

| Ingredient | S1424-112-01 wt. % | S1424-112-02 wt. % | S1424-112-04 wt. % |
|---|---|---|---|
| Dicamba/DGA, 55% acid | 65.36 | 65.36 | 65.36 |
| silicone emulsion (antifoam agent) | 0.15 | 0.15 | 0.15 |
| Water | 21.01 | 21.01 | 21.01 |
| PG | 5.00 | 5.00 | 5.00 |
| Xanthan gum pregel | 2.00 | 3.00 | 5.00 |
| Extra Water | 3.00 | 2.00 | 0.00 |
| Native Guar | 3.48 | 3.48 | 3.48 |
| Total | 100.00 | 100.00 | 100.00 |

Property Observation

| | S1424-112-01 | S1424-112-02 | S1424-112-04 |
|---|---|---|---|
| Viscosity (as prepared) | 63.00 | 162.00 | 274.00 |
| pH (as prepared) | 5.50 | 5.50 | 5.49 |
| Appearance (final formulation) | Clear low viscosity liquid free of sediments | Clear low viscosity liquid free of sediments | Clear low-moderate viscosity liquid free of sediments |
| Appearance (Overnight, RT) | 30% Separation Sediments observed | Clear low viscosity liquid free of sediments | Clear low-moderate viscosity liquid free of sediments |
| Pour-outs (Overnight, RT) | 2 | 1 | 1 |
| Appearance (Overnight, 54 C.) | 50% sediments bottom half gelled | 50% sediments bottom half gelled | 50% sediments bottom half gelled |
| Pour-outs (Overnight, 54 C.) | 5 | >10 | >10 |

Incorporation of Attapulgite in Dicamba-DGA Formulations

It was surprisingly discovered that incorporation of attapulgite in the Dicamba-DGA+3.48% guar formulation prototypes inhibited the formation of a gel structure at high temperature. The formulations remained flowable at both, room temperature and cold temperature (−10° C.) In the short term stability studies (2-3 days at 54° C., RT, −10° C.), the samples containing both attapulgite and xanthan guam showed acceptable storage stability performance: It was observed that viscosity and pH did not significantly change. (additionally, no serum/sedimentation was observed and formulations remained flowable at both, high and low temperatures)

TABLE C

Effect of clay and surfactants on short term stability study

| Ingredient | S1424-119-01 wt. % | S1424-119-02 wt. % |
|---|---|---|
| Dicamba/DGA, 55% acid | 65.36 | 65.36 |
| silicone emulsion (antifoam agent) | 0.45 | 0.45 |
| PG | 7.50 | 7.50 |
| Xanthan Gum PreGel | 3.00 | 3.00 |
| attagulgite | 1.00 | 1.00 |
| Native Guar | 3.48 | 3.48 |
| sodium oleyl N-methyl laurate | 0.25 | 0.25 |
| alcohol ethoxylate | | 0.25 |
| Water | Rest | Rest |
| Total | 100.00 | 100.00 |

Example B

Procedure to Prepare Dicamba-DGA Salt

A Dicamba-DGA salt is prepared by neutralizing 1:1 ratio of Dicamba acid with Diglycolamine(DGA). The Dicamba-DGA salt is equivalent to 55% by weight Dicamba acid and is referred to as Dicamba-DGA, 55% acid. The composition is as follows:

TABLE 1

Composition of Dicamba-DGA, 55% acid

| Ingredient | Purity (%) | Weight (%) |
|---|---|---|
| Dicamba acid | 98 | 56.12 |
| Diglycolamine(DGA) | 98 | 26.70 |
| Benzisothiazolinone(preservative) | | 0.05 |
| Water(40 ppm hardness) | | 17.13 |

In a round bottom flask, the required amount of dicamba acid, water and preservative were added. With an overhead stirrer, adjust speed to moderate level ~700-800 rpm. With a nitrogen blanket, slowly add the diglycolamine and continue mixing at a moderate speed of 700-800 rpm for 2 hours. The final product of Dicamba-DGA is a pinkish, brown solution.

Procedure to Make Xanthan Gum Pregel

1. Take 980 gm DI water in a beaker and start mixing with an overhead stirrer
2. Adjust the speed to 300-500 rpm to create good mixing.
3. While mixing, slowly add 15 gm of Xanthan Gum and 5 gm of Preservative (1,2-benzisothiazolin-3-one) and mix at least for 1 hour to allow the Xanthan Gum to disperse uniformly and form a uniform solution
4. Stop mixing and transfer the Xanthan gum Pregel to appropriate container Procedure to Make Dicamba-DGA Built-in Formulation 1. Add Dicamba-DGA salt solution in a beaker and start mixing with a overhead stirrer.

2. Adjust the speed (300-400 rpm) to have good mixing.
3. While mixing, charge guar slowly under moderately high shear (700-800 rpm) and continue mixing for at least 30 minutes until the guar is fully dispersed.
4. While mixing, add PEG-400 or other solvents, and surfactants slowly and continue mixing for 10 minutes.
5. While mixing, add attapulgite slowly under moderate shear and continue mixing for at least 10-20 minutes until fully dispersed.
6. While mixing add Preservative (1,2-benzisothiazolin-3-one), water and antifoam and continue mixing for another 10-20 minutes
7. While mixing, add Xanthan Gum Pregel slowly and allow to mix for another 45 minutes.
8. Stop mixing and transfer to appropriate container The following examples show the development of a stable built-in formulation containing herbicide and drift reducing agent.

Example 1

Formulation of Dicamba-DGA With Different Guars as Drift Reducing Agent

Six formulations of Dicamba-DGA salt with different guar and guar derivatives is shown in Table 2 to see whether guar and guar derivatives can be incorporated in a herbicide formulation. PEG-400 is observed to inhibit hydration of all three guars (native guar, hydroxypropyl guar, and CMHP Guar (carboxymethyl hydroxypropyl guar) whereas PG (propylene glycol) is effective as a hydration inhibitor when added to a combination of Dicamba-DGA and native guar. Since, guar and guar derivatives were not soluble, the formulations separated into two layers. This indicates that the hydration of guar and guar derivatives can be inhibited. However, the guar particles need to be suspended to make a viable Dicamba-DGA herbicide formulation with guar and guar derivatives as a built-in formulation.

Example 2

Built-in Stable Formulations of 434 g/l Dicamba-DGA With Guar as Built-in Drift Reducing Agent and Suspension Aid In Table 3, 3 different formulations are shown with different thickeners to stabilize the Dicamba-DGA herbicide formulation with guar as drift reducing agent. Clay and xanthan were used as thickeners. The composition as shown in Table 3 were made and their physical properties were measured initially after making it and then aged at different temperatures ( TABLE 3-continued Formulation containing 434 gm/liter of Dicamba-DGA with build-in drift reducing agent

| Function | Ingredient | 2A wt/wt % | 2B wt/wt % | 2C wt/wt % |
|---|---|---|---|---|
| Suspending aid | Xanthan gum PreGel | 3.60 | 2.80 | 2.80 |
| Solvent | PEG 400 | 20.00 | 20.00 | 20.00 |
| Solvent | Propylene Glycol | 0.00 | 0.00 | 0.00 |
| Surfactant | Alcohol ethoxylate surfactant | 0.00 | 2.00 | 0.00 |
| Surfactant | Sodium laureth sulfate | 0.00 | 0.00 | 3.00 |
| Surfactant | Sodium oleyl N-methyl taurate | 0.25 | 0.00 | 0.00 |
| Herbicide | Dicamba/DGA, 55% acid | 65.36 | 65.36 | 65.36 |
| Antifoam | Silicone antifoam | 0.45 | 0.45 | 0.45 |
| Preservative | benziso-thiazolinone | 0.07 | 0.07 | 0.07 |
| Drift reducing agent | Guar gum | 3.48 | 3.48 | 3.48 |
|  | Extra Water | 0.00 | 0.00 | 0.00 |
|  | Total | 100.00 | 100.00 | 100.00 |
| Physical evaluation |  |  |  |  |
| Initial Properties | Appearance | Light brown | Brown | Brown |
|  | Viscosity (as Prepared)(LV02, 30 rpm), cP | 249 | 329 | 325 |
|  | Viscosity (as Prepared) (LV02, 5 rpm), cP | 312.00 | 378.00 | 480 |
|  | pH | 7.72 | 7.99 | 7.99 |
|  | Density (g/mL) | 1.2425 | 1.2424 | 1.2464 |
| 3 days | Aging at RT |  |  |  |
|  | Appearance | Brown | Brown | Brown |
|  | % Separation | 0% | 0% | 0% |
|  | Pour out Counts | 1 | 1 | 1 |
|  | Viscosity (LV02, 30 rpm), cP | 199 | 405 | 398 |
|  | Viscosity (LV02, 5 rpm), cP |  | 504 | 678 |
|  | pH | 7.9 |  | 8.1 |
|  | Aging at 54° C. |  |  |  |
|  | Appearance | Brown | Brown | Brown |
|  | % Separation | 20% | 0% | 0% |
|  | Pour out Counts | 1 | 1 | 1 |
|  | Viscosity (LV02, 30 rpm), cP |  | 557 | 368 |
|  | Viscosity (LV02, 5 rpm), cP |  | 780 | 594 |
|  | pH | 7.88 | 8.11 | 8.08 |
|  | Aging at −16° C. |  |  |  |
|  | Appearance | Gel-like flowable | Gel-like flowable | Gel-like flowable |
|  | % Separation | 0% | 0% | 0% |
|  | Pour out Counts | 1 | 1 | 1 |
|  | Viscosity (LV02, 30 rpm), cP | 235 | 482 | 448 |
|  | Viscosity (LV02, 5 rpm), cP |  | 612 | 624 |
|  | pH | 7.9 | 8.13 | 8.13 |
| 2 weeks | Aging at RT |  |  |  |
|  | Appearance | Brown | Brown | Brown |
|  | % Separation | 0% | 0% | 0% |
|  | Pour out Counts | 1 | 1 | 1 |
|  | Viscosity (LV02, 30 rpm), cP | 251 | 410 | 420 |
|  | Viscosity (LV02, 5 rpm), cP | 372 | 636 | 612 |
|  | pH | 7.81 | 7.9 | 7.94 |
|  | Aging at 54° C. |  |  |  |
|  | Appearance | Brown | Brown | Brown |
|  | % Separation | 48% | 10% | 8% |
|  | Pour out Counts | 1 | 1 | 1 |
|  | Viscosity (LV02, 30 rpm), cP | 262 | 450 | 449 |
|  | Viscosity (LV02, 5 rpm), cP | 360 | 816 | 726 |
|  | pH | 8 | 7.92 | 7.98 |
|  | Aging at −16° C. |  |  |  |
|  | Appearance | Gel like flowable | Gel like flowable | Gel like flowable |
|  | % Separation | 0% | 0% | 0% |
|  | Pour out Counts | 1 | 1 | 1 |
|  | Viscosity (LV02, 30 rpm), cP | 294 | 359 | 385 |
|  | Viscosity (LV02, 5 rpm), cP | 318 | 570 | 498 |
|  | pH | 7.81 | 8 | 8 |

Example 3

Built-in Stable Formulations of 360 g/l Dicamba-DGA With Guar as Drift Reducing Agent and Suspension Aid In Table 4, the Dicamba-DGA salt concentration was lowered to 360 gm/liter and two formulations with guar as drift reducing agent are made with a combination clay and xanthan as thickening agent. Again, the physical properties were measured initially and then after aging at different temperatures (room temperature ~20 C, 54 C and ~16 C). The formulations are stable after 3 days at all three temperatures (room temperature ~20 C, 54 C and −16 C)

TABLE 4

Formulation containing 360 gm/l of Dicamba-DGA with built-in drift reducing agent

| Function | Ingredient | 3A wt/wt % | 3B wt/wt % |
|---|---|---|---|
|  | Water | 1.91 | 1.86 |
| Suspending aid | Attapulgite clay (20% active) | 2.00 | 2.00 |
| Solvent | PEG 400 | 30.00 | 30.00 |
| surfactant | Sodium oleyl N-methyl taurate | 3.00 | 3.00 |
| Herbicide | Dicamba/DGA, 55% acid | 54.12 | 54.12 |
| Suspending aid | Xanthangum pregel | 3.20 | 3.20 |
| Surfactant | Alcohol ethoxylate surfactant | 0.25 | 0.30 |
| Antifoam | Silicone antifoam | 0.45 | 0.45 |
| Preservative | Benzisothiazolinone | 0.07 | 0.07 |
| Drift reducing agent | Guar gum | 5.00 | 5.00 |
|  | Total | 100.00 | 100.00 |

TABLE 4-continued

Formulation containing 360 gm/l of Dicamba-DGA with built-in drift reducing agent

| Function | Ingredient | Formulation ID 3A wt/wt % | Formulation ID 3B wt/wt % |
|---|---|---|---|
| | Physical evaluation | | |
| Initial Properties | Appearance | Brown | Brown |
| | Viscosity (as Prepared) (LV02, 30 rpm), cP | 450 | 389 |
| | Viscosity (as Prepared) (LV02, 5 rpm), cP | 666 | 588 |
| | pH | 8.3 | 8.35 |
| | Density (g/mL) | 1.2277 | 1.2279 |
| 3 days | Aging at RT | | |
| | Appearance | Brown | Brown |
| | % Separation | 0% | 0% |
| | Pour out Counts | 1 | 1 |
| | Viscosity (LV02, 30 rpm), cP | 486 | 454 |
| | Viscosity (LV02, 5 rpm), cP | 768 | 564 |
| | pH | 8.22 | 8.28 |
| | Aging at 54° C. | | |
| | Appearance | Brown | Brown |
| | % Separation | 0% | 0% |
| | Pour out Counts | 1 | 1 |
| | Viscosity (LV02, 30 rpm), cP | 560 | 520 |
| | Viscosity (LV02, 5 rpm), cP | 816 | 834 |
| | pH | 8.29 | 8.31 |
| | Aging at −16° C. | | |
| | Appearance | Gel-like flowable | Gel-like flowable |
| | % Separation | 0% | 0% |
| | Pour out Counts | 1 | 1 |
| | Viscosity (LV02, 30 rpm), cP | 535 | 465 |
| | Viscosity (LV02, 5 rpm)cP | 732 | 612 |
| | pH | 8.35 | 8.34 |
| 2 weeks | Aging at RT | | |
| | Appearance | Brown | Brown |
| | % Separation | 0% | 0% |
| | Pour out Counts | 1 | 1 |
| | Viscosity (LV02, 30 rpm), cP | 500 | 450 |
| | Viscosity (LV02, 5 rpm), cP | 810 | 684 |
| | pH | 8.14 | 8.21 |
| | Aging at 54° C. | | |
| | Appearance | Brown | Brown |
| | % Separation | 15% | 13% |
| | Pour out Counts | 1 | 1 |
| | Viscosity (LV02, 30 rpm), cP | 474 | 405 |
| | Viscosity (LV02, 5 rpm), cP | 888 | 654 |
| | pH | 8.15 | 8.15 |
| | Aging at −16° C. | | |
| | Appearance | | Gel-like flowable |
| | % Separation | 6% | 7% |
| | Pour out Counts | 1 | 1 |
| | Viscosity (LV02, 30 rpm), cP | 514 | 440 |
| | Viscosity (LV02, 5 rpm)cP | 774 | 540 |
| | pH | 8.3 | 8.33 |

Example 4

Built-in Formulation of 360 g/l Dicamba-DGA With Polyacrylamide Copolymer and Guar as Drift-Reducing Agent In Table 5, polyacrylamide copolymer and guar are used as drift reducing agents. The Dicamba-DGA salt concentration was 360 gm/liter and two formulations with polyacrylamide copolymer and guar as drift reducing agent are made with a combination clay and xanthan as thickening agent. Again, the physical properties were measured initially and then after aging at different temperatures (room temperature ~20 C, 54 C and −16 C). The formulations are stable after 3 days at all three temperatures (room temperature ~20 C, 54 C and −16 C)

TABLE 5

Formulation containing 360 gm/l of Dicamba-DGA with polyacrylamide copolymer and guar as drift reducing agent

| Function | Ingredient | Formulation ID 4A wt/wt % | Formulation ID 4B wt/wt % |
|---|---|---|---|
| | Water | 9.58 | 4.58 |
| Suspending aid | Attapulgite clay (20% active) | 2.00 | 2.00 |
| Solvent | PEG 400 | 25.00 | 30.00 |
| Antifoam | Silicone antifoam | 0.50 | 0.50 |
| Surfactant | Sodium laureth sulfate | 3.00 | 3.00 |
| Surfactant | Alcohol ethoxylate | 0.25 | 0.25 |
| Suspending aid | Xanthan gum PreGel | 3.00 | 3.00 |
| Herbicide | Dicamba/DGA, 55% acid | 53.08 | 53.08 |
| Preservative | Benzisothiazolinone | 0.06 | 0.06 |
| Drift reducing agent | 20% active emulsion copolymer of acrylamide-acrylic acid | 1.53 | 1.53 |
| Drift reducing agent | Guar gum | 2.00 | 2.00 |
| | Total | 100.00 | 100.00 |
| | Physical evaluation | | |
| Initial Properties | Appearance | Light brown | Light brown |
| | Viscosity (as Prepared) (LV02, 30 rpm), cP | 252 | 301 |
| | Viscosity (as Prepared) (LV02, 5 rpm), cP | | |
| | pH | 7.62 | 7.84 |
| | Density (g/mL) | 1.2127 | 1.2185 |
| 3 days | Aging at RT | | |
| | Appearance | Brown | Brown |
| | % Separation | 0% | 0% |
| | Pour out Counts | 1 | 1 |
| | Viscosity (LV02, 30 rpm), cP | 220 | 304 |
| | Viscosity (LV02, 5 rpm), cP | 342 | 492 |
| | pH | 7.75 | 7.96 |
| | Aging at 54° C. | | |
| | Appearance | Brown | Brown |
| | % Separation | 0% | 0% |
| | Pour out Counts | 1 | 1 |
| | Viscosity (LV02, 30 rpm), cP | 212 | 318 |
| | Viscosity (LV02, 5 rpm), cP | 384 | 558 |
| | pH | 7.75 | 7.94 |
| | Aging at −16° C. | | |
| | Appearance | Gel-like flowable | Gel-like flowable |
| | % Separation | 0% | 0% |
| | Pour out Counts | 1 | 1 |
| | Viscosity (LV02, 30 rpm), cP | 285 | 444 |
| | Viscosity (LV02, 5 rpm), cP | 360 | 618 |
| | pH | 7.78 | 7.99 |
| 2 weeks | Aging at RT | | |
| | Appearance | Brown | Brown |
| | % Separation | 2% | 0% |
| | Pour out Counts | 1 | 1 |
| | Viscosity (LV02, 30 rpm), cP | 212 | 317 |
| | Viscosity (LV02, 5 rpm), cP | 402 | 564 |
| | pH | 7.63 | 7.82 |
| | Aging at 54° C. | | |
| | Appearance | Brown | Brown |
| | % Separation | 12% | 8% |

TABLE 5-continued

Formulation containing 360 gm/l of Dicamba-DGA with polyacrylamide copolymer and guar as drift reducing agent

| Function | Ingredient | Formulation ID 4A wt/wt % | Formulation ID 4B wt/wt % |
|---|---|---|---|
| | Pour out Counts | 1 | 1 |
| | Viscosity (LV02, 30 rpm), cP | 235 | 340 |
| | Viscosity (LV02, 5 rpm), cP | 420 | 660 |
| | pH | 7.57 | 7.77 |
| | Aging at −16° C. | | |
| | Appearance | Gel like-Flowable | Gel like-Flowable |
| | % Separation | 0 | 0 |
| | Pour out Counts | 1 | 1 |
| | Viscosity (LV02, 30 rpm), cP | 205 | 300 |
| | Viscosity (LV02, 5 rpm), cP | 312 | 534 |
| | pH | 7.6 | 7.81 |

Example 5

Application Testing of Built-in Formulation of Dicamba-DGA With Guar as Drift Reducing Agent In Table 6, application testing is performed on 3 different formulations with different levels of drift reducing agent. The drift reducing agent (guar gum) in the formulation was varied from 2 to 5%. Then 2% of the formulation was added to hard water with 342 ppm calcium and tested for foaming, compatibility and drift properties (volume %<150 microns, volume mean diameter of the droplets (VMD) and % reduction in driftable fines. Foaming was determined by adding 2% of the formulation to 342 ppm hard water in a graduated cylinder and inverting the cylinder 30 times to generate a foam and observing the time for the foam to disappear. Compatibility was determined by adding 2% of the formulation to 342 ppm water in a graduated cylinder and inverting it several times and observing the number of times required for the formulation to disperse well. Drift properties were measured by spraying a solution of 2% formulation in 342 ppm hard water through a nozzle and observing the particle size distribution of the droplets generated. From the particle size distribution, the volume mean diameter of the droplets, % driftable fines (defined as volume %<150 microns) were determined. The % reduction in driftable fines is determined as the ratio of the decrease in driftable fines in the presence of the drift reducing agent to the driftable fines in 342 ppm water Depending on the amount of drift reducing agent added in the formulation, the drift reduction varies from 45 to 70%. This indicates that the amount of drift reduction in the herbicide formulation can be adjusted by the amount of drift reducing agent added to the formulation.

TABLE 6

Drift reduction application results for formulations with different levels of drift reducing agent

| Ingredient | 5A wt. % | 5B wt. % | 5C wt. % |
|---|---|---|---|
| Water | 23.87 | 23.37 | 20.87 |
| Dicamba/DGA, 55% acid | 52.96 | 52.96 | 52.96 |
| Guar gum | 2.00 | 2.50 | 5.00 |
| PEG 400 | 15.00 | 15.00 | 15.00 |
| Alcohol ethoxylate surfactant | 1.00 | 1.00 | 1.00 |
| Attapulgite clay (20% active) | 2.00 | 2.00 | 2.00 |
| Benzisothiazolinone (preservative) | 0.07 | 0.07 | 0.07 |
| Antifoam | 0.30 | 0.30 | 0.30 |
| Xanthan gum PreGel | 2.80 | 2.80 | 2.80 |
| Total | 100.00 | 100.00 | 100.00 |
| Initial Physical Data | | | |
| Appearance | brown | brown | Brown |
| Viscosity (LV02, 30 rpm, 25° C.), cP | 117 | 140 | 300 |
| Viscosity (LV02, 5 rpm, 25° C.), cP | 288 | 366 | 840 |
| pH (as is at 25° C.) | 6.31 | 6.77 | 6.73 |
| Density (g/mL) | 1.1892 | 1.1976 | 1.2067 |
| Application Testing | | | |
| Foam | disappeared in less than 5 secs. | disappeared in less than 5 secs. | Disappeared in <5 secs. |
| Compatibility with 342 ppm water | 6 inversions | 7 inversions | 5 inversions |
| Drift Testing @ 2% of formulation in 342 ppm hard water | | | |
| VMD(microns) | 481 | 491 | 629 |
| Volume % driftable fines (<150 microns) | 8 | 7 | 4.33 |
| % reduction in driftable fines relative to 342 ppm hard water | 46% | 52% | 71% |

What is claimed is:

1. A pesticide composition comprising, by total weight of the composition:
    a pesticide comprising at least one water-soluble salt of an auxin herbicide;
    greater than 1 wt % of an incompletely hydrated drift control agent suspended in a liquid medium;
    a hydration inhibitor component comprising choline chloride, a glycol, a glycol derivative, glycerine, a glycerine derivative or a combination thereof; and
    a suspending agent in an amount effective to impart shear thinning properties to the composition, the suspending agent comprising:
        (i) xanthan gum; and
        (ii) attapulgite;
        wherein the suspending agent is in an amount of at least 0.5 pbw to 10 pbw based on 100 pbw of the composition.

2. The composition of claim 1 wherein the attapulgite is of formula (Mg,Al)5Si8O20.4H2O.

3. The composition of claim 1 wherein the attapulgite has a bulk density lower than 1,000 kg/m3.

4. The composition of claim 1 wherein the attapulgite has a specific gravity greater than 1.3.

5. The composition of claim 1 wherein the drift control agent is a water-soluble polymer.

6. The composition of claim 1 wherein the drift control agent is a polyacrylamide derivative.

7. The composition of claim 1 wherein the polyacrylamide derivative is acrylamide copolymerized with at least one of dimethylacrylamides (DMA), acrylamidomethylpropanesulfonic acids (AMPS), or acrylic acid (AA).

8. The composition of claim 1 wherein the pesticide comprises a dicamba salt, wherein the salt is N,N-bis(3-aminopropyl)methylamine, diethanolamine, monoethanolamine, dimethylamine, isopropylamine, dimethylethanolamine, diglycolamine, potassium, choline, or sodium.

9. The composition of claim 1 wherein the pesticide comprises dicamba diglycolamine salt or dicamba N,N-bis(3-aminopropyl)methylamine salt.

10. The composition of claim 1 wherein the drift control agent comprises a guar derivative, the guar derivative comprising cationic guar, carboxymethyl guar (CM guar), hydroxyethyl guar (HE guar), hydroxypropyl guar (HP guar), carboxymethylhydroxypropyl guar (CMHP guar), hydrophobically modified guar (HM guar), hydrophobically modified carboxymethyl guar (HMCM guar), hydrophobically modified hydroxyethyl guar (HMHE guar), hydrophobically modified hydroxypropyl guar (HMHP guar), cationic hydrophobically modified hydroxypropyl guar (cationic HMHP guar), hydrophobically modified carboxymethylhydroxypropyl guar (HMCMHP guar), hydrophobically modified cationic guar (HM cationic guar), guar hydroxypropyl trimonium chloride, or hydroxypropyl guar hydroxypropyl trimonium chloride.

11. The composition of claim 1 wherein the drift control agent is native guar, polyacrylamide, a cationic hydroxypropyl guar, a cationic guar, or a combination thereof.

12. The composition of claim 1 wherein the hydration inhibitor component comprises propylene glycol or poly(ethylene glycol).

13. The composition of claim 1 wherein the drift control agent is guar gum and the hydration inhibitor component is propylene glycol.

14. The composition of claim 1 whereby the composition is stable at a temperature greater than 50° C. for at least 24 hours.

15. The composition of claim 1 whereby the composition is stable at a temperature greater than 50° C. for at least 48 hours.

16. The composition of claim 1 whereby the composition is stable for at least 24 hours at room temperature.

17. The composition of claim 1 further comprising one or more surfactants.

18. The composition of claim 1, wherein the suspending agent further comprises hydrophobic fumed silica.

19. The composition of claim 1, wherein the suspending agent comprises at least a hydrophobic fumed silica which has been hydrophobized by means of dimethyldichlorosilane.

20. The composition of claim 1 wherein the hydration inhibitor component is present in an amount effective to inhibit hydration of the water-soluble polysaccharide in the aqueous medium and wherein the hydration inhibitor component further comprises at least one of: one or more surfactant compounds, one or more water-soluble non-surfactant salts, or one or more water dispersible organic solvents.

21. The composition of claim 1, wherein the liquid medium is an aqueous liquid medium that comprises water or water and a water immiscible organic liquid, and wherein the composition is in the form of an emulsion, a microemulsion, or a suspoemulsion.

22. The composition of claim 1 wherein the composition exhibits a viscosity of less than 10 Pa·s at a shear rate of greater than or equal to 10 s$^{-1}$.

23. The composition of claim 1 wherein the composition comprises greater than 1.8 wt % of an incompletely hydrated drift control agent suspended in a liquid medium.

24. The composition of claim 1 wherein the composition comprises greater than 2 wt % of an incompletely hydrated drift control agent suspended in a liquid medium.

25. The composition of claim 1 wherein the composition comprises greater than 2.4 wt % of an incompletely hydrated drift control agent suspended in a liquid medium.

26. The composition of claim 1 wherein the hydration inhibitor component further comprises choline bicarbonate, choline dihydrogen citrate, choline bitarate, potassium hydrogen phosphate, potassium carbonate, or any combination thereof.

27. The composition of claim 1 wherein the composition exhibits:
    a viscosity of greater than or equal to 5 Pa·s at a shear rate of less than 0.01 s−1, and
    a viscosity of less than 5 Pa·s at a shear rate of greater than 10 s−1.

28. The composition of claim 1 wherein the composition is free or substantially free of ammonium-containing compounds.

29. The composition of claim 1, wherein the composition comprises greater than 1 wt % of hydrophobic silica by total weight of composition.

30. The composition of claim 1 further comprising the presence of at least 300 g/L of water soluble salts.

31. The composition of claim 1, wherein the composition comprises at least 300 g/L of at least one water-soluble salt of an auxin herbicide.

32. The composition of claim 1, wherein the composition comprises greater than 10 wt % of an aqueous liquid medium by total weight of the composition.

33. A pesticide composition comprising, by total weight of the composition:
    a pesticide comprising an auxin herbicide or a salt thereof;
    greater than 1 wt % of an incompletely hydrated drift control agent suspended in a liquid medium;
    a hydration inhibitor component comprising choline chloride, a glycol, a glycol derivative, glycerine, a glycerine derivative or a combination thereof; and
    a suspending agent in an amount effective to impart shear thinning properties to the composition, the suspending agent comprising:
       at least one of xanthan gum, rheozan, and diutan gum; and
       attapulgite clay;
       wherein the suspending agent is in an amount of at least 0.5 pbw to 10 pbw based on 100 pbw of the composition.

34. The composition of claim 1, wherein the composition is flowable and stable at temperatures greater than −10° C. and up to 54° C.

* * * * *